(12) United States Patent
Lin et al.

(10) Patent No.: US 11,099,692 B2
(45) Date of Patent: Aug. 24, 2021

(54) SENSOR DEVICE AND METHOD

(71) Applicant: Tangi0 Limited, London (GB)

(72) Inventors: Chia-hung Lin, London (GB); Ilan Johan Eduardo Olivarez Correa, London (GB); Liucheng Guo, London (GB); Ming Kong, London (GB)

(73) Assignee: Tangi0 Limited, London (GB)

( * ) Notice: Subject to any disclaimer, the term of this patent is extended or adjusted under 35 U.S.C. 154(b) by 0 days.

(21) Appl. No.: 16/615,719

(22) PCT Filed: May 22, 2018

(86) PCT No.: PCT/GB2018/051392
§ 371 (c)(1),
(2) Date: Nov. 21, 2019

(87) PCT Pub. No.: WO2018/215761
PCT Pub. Date: Nov. 29, 2018

(65) Prior Publication Data
US 2020/0174625 A1     Jun. 4, 2020

(30) Foreign Application Priority Data
May 22, 2017 (GB) ..................... 1708210

(51) Int. Cl.
*G06F 3/044* (2006.01)
*G06F 3/045* (2006.01)
*G06F 3/041* (2006.01)

(52) U.S. Cl.
CPC ............ *G06F 3/0443* (2019.05); *G06F 3/045* (2013.01); *G06F 3/0416* (2013.01);
(Continued)

(58) Field of Classification Search
CPC ...... G06F 3/044; G06F 3/0443; G06F 3/0446; G06F 3/0447; G06F 3/0416;
(Continued)

(56) References Cited

U.S. PATENT DOCUMENTS

| 5,510,812 A | 4/1996 | O'Mara | |
|---|---|---|---|
| 2004/0206615 A1* | 10/2004 | Aisenbrey | ............ H01H 13/785 200/262 |

(Continued)

FOREIGN PATENT DOCUMENTS

| CN | 102591485 | 7/2012 |
|---|---|---|
| CN | 106197772 | 12/2016 |

(Continued)

OTHER PUBLICATIONS

GB Search Report, GB Patent Application No. 1708210.8, date of report Nov. 22, 2017.

(Continued)

*Primary Examiner* — Christopher E Leiby
(74) *Attorney, Agent, or Firm* — Andrus Intellectual Property Law, LLP

(57) ABSTRACT

A sensor device has a plurality of electrode portions configured to provide one or more electrical signals and a non-conductive material provided on or over the plurality of electrode portions. The one or more electrical signals are provided in response to a change in capacitance between (i) at least one of the plurality of electrode portions and a conductive object being near to or in contact with the non-conductive material, and/or (ii) at least one of the plurality of electrode portions and at least one other of the plurality of electrode portions. A system comprising the sensor device and method of manufacturing the sensor device are also provided.

18 Claims, 16 Drawing Sheets

(52) U.S. Cl.
CPC .......... *G06F 3/0446* (2019.05); *G06F 3/0447* (2019.05); *G06F 2203/04104* (2013.01)

(58) Field of Classification Search
CPC .... G06F 3/0414; G06F 3/03547; G06F 3/045; G06F 2203/04105; G06F 2203/04104; H01H 2239/074; H01H 2239/006; H01H 2203/04108; H01H 2003/0293; H01H 13/704
See application file for complete search history.

(56) References Cited

U.S. PATENT DOCUMENTS

| | | | |
|---|---|---|---|
| 2006/0232559 A1* | 10/2006 | Chien | G06F 3/044 345/168 |
| 2006/0278514 A1 | 12/2006 | Roussin-Bouchard | |
| 2007/0256915 A1 | 11/2007 | Levy | |
| 2010/0013775 A1 | 1/2010 | Son | |
| 2012/0046104 A1 | 2/2012 | Wright | |
| 2014/0267152 A1 | 9/2014 | Curtis | |
| 2016/0170543 A1 | 6/2016 | Kawamura | |

FOREIGN PATENT DOCUMENTS

| | | |
|---|---|---|
| JP | 2002313187 | 4/2001 |
| JP | 2012089238 | 5/2012 |
| KR | 20160135693 | 11/2016 |
| WO | 2014113542 | 7/2014 |
| WO | 2016206819 | 12/2016 |
| WO | WO 2016199517 A1 | 12/2016 |

OTHER PUBLICATIONS

GB Search Report, GB Patent Application No. 1808374.1, date of report Nov. 23, 2018.
International Search Report and the Written Opinion for PCT/GB2018/051392, dated Jul. 31, 2018.

* cited by examiner

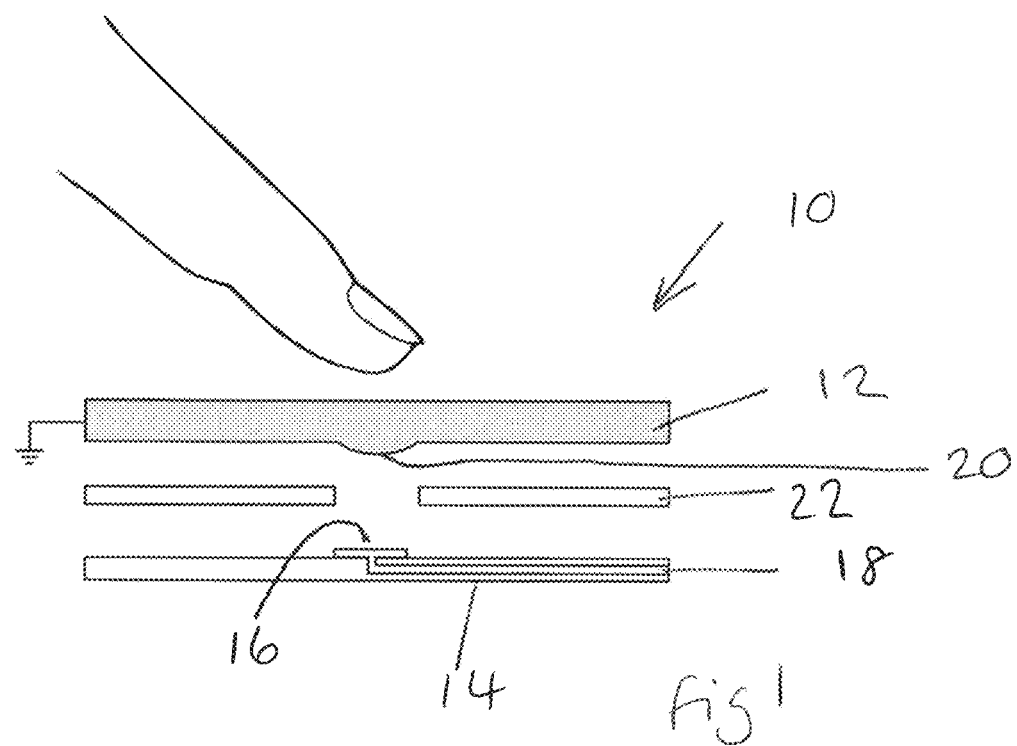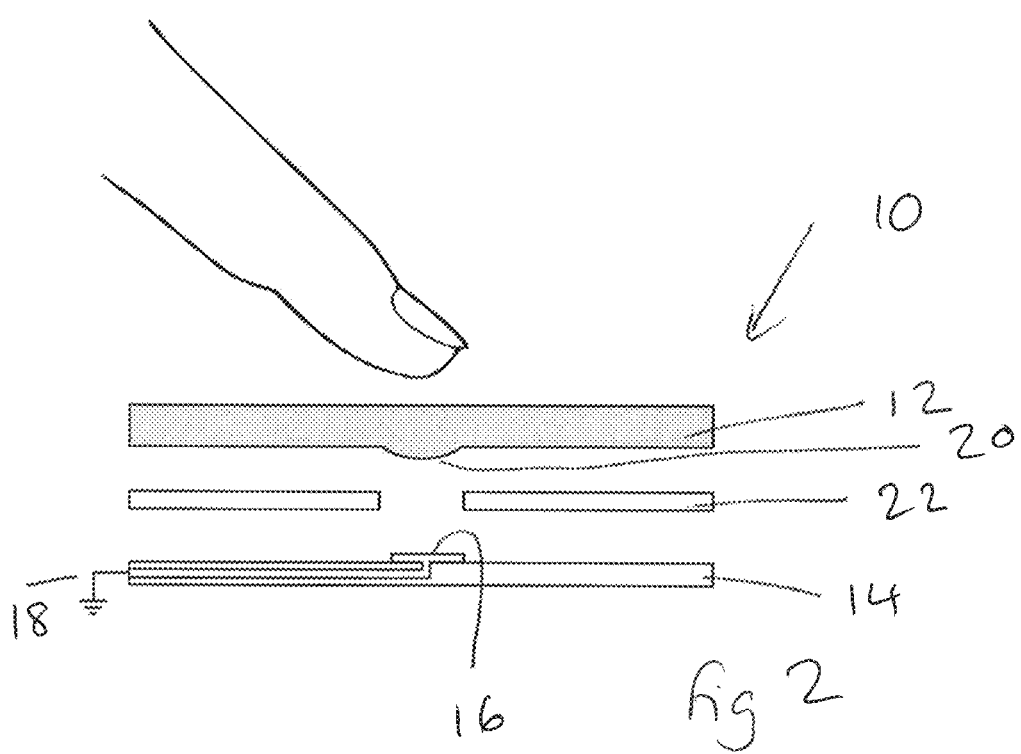

Single slide

Multi-level touch with one single electrode

Multi touch with more than one finger (zoom)

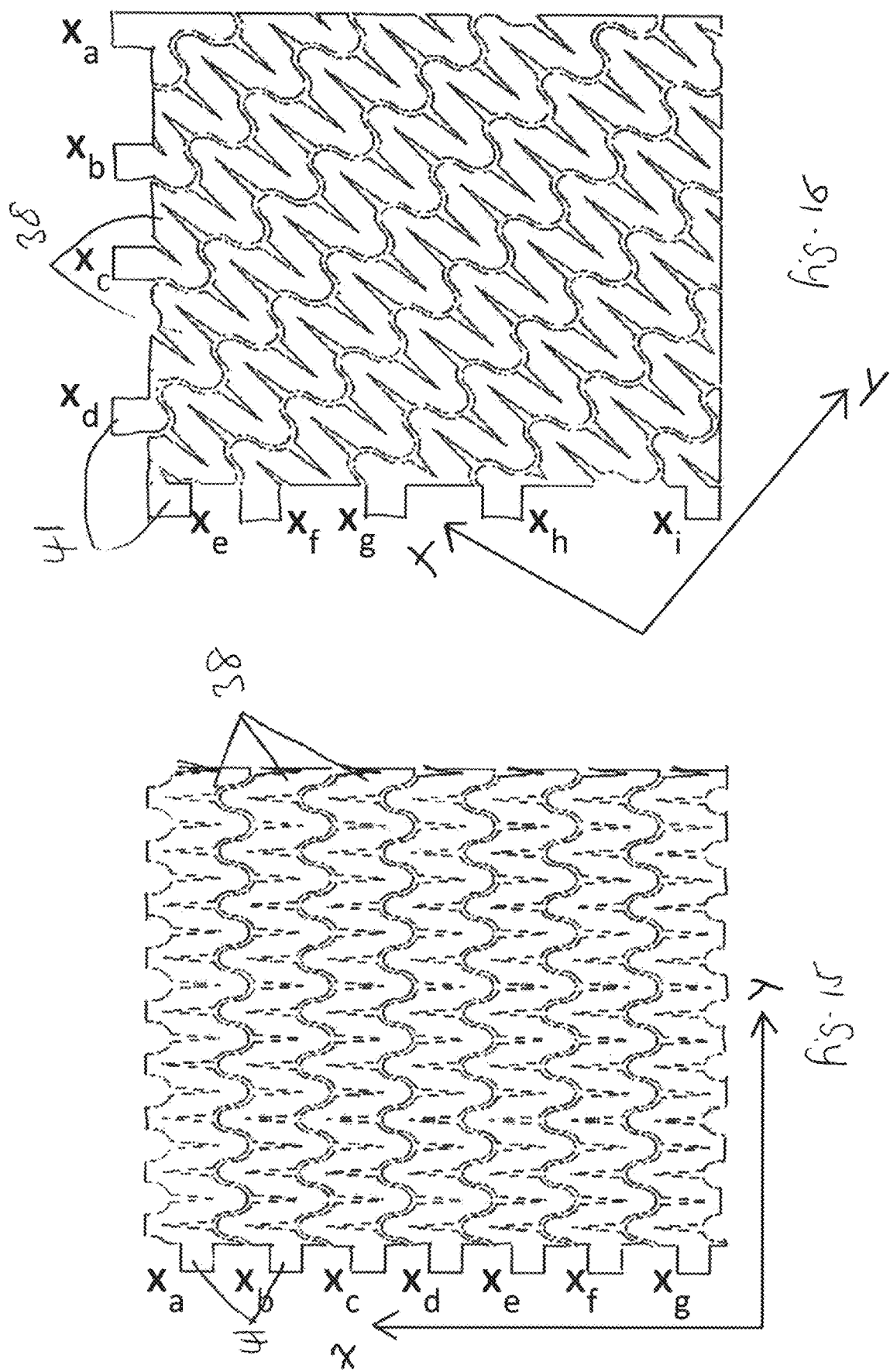

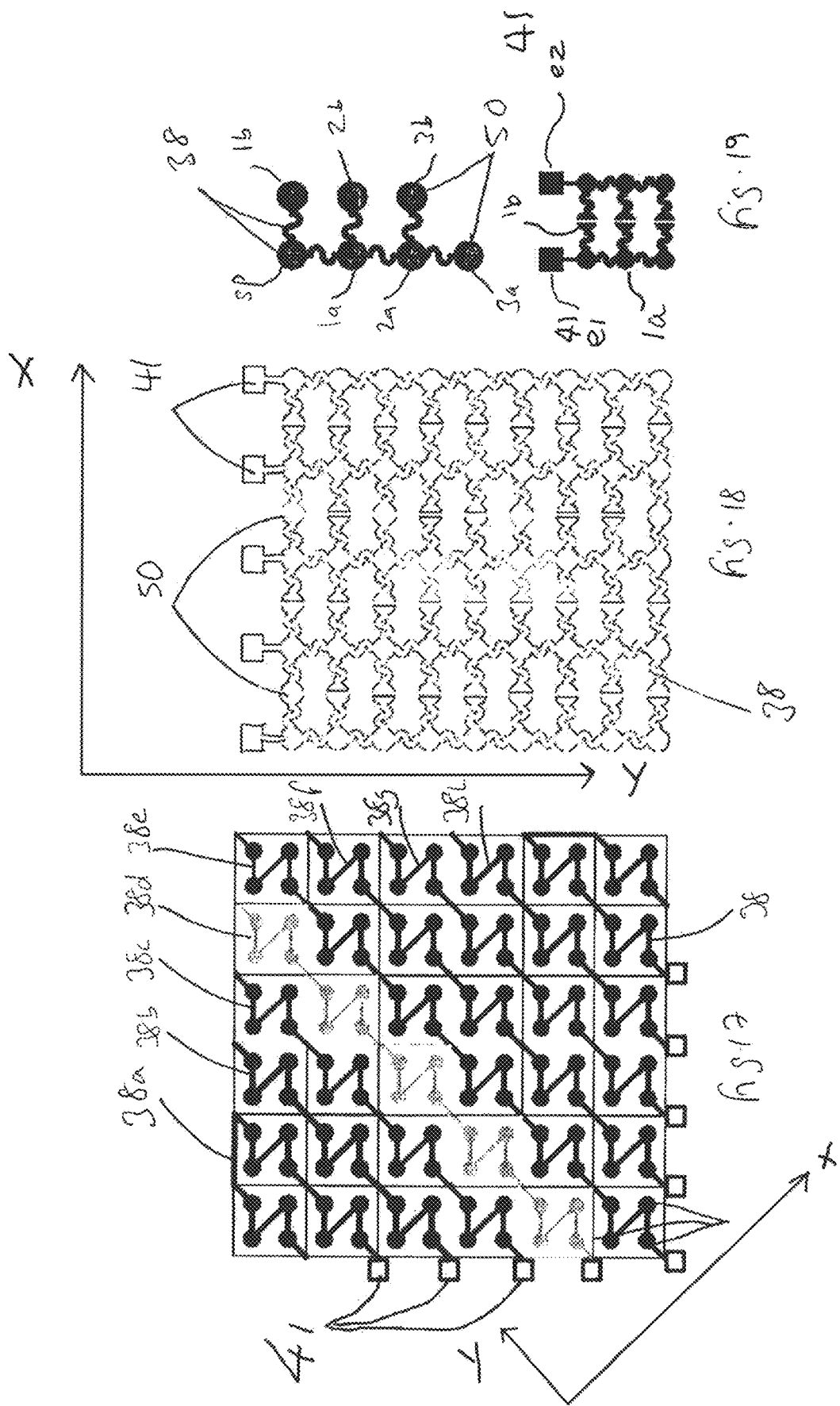

SENSOR DEVICE AND METHOD

CROSS-REFERENCE TO RELATED APPLICATIONS

This application is the U.S. national stage application of International Application PCT/GB2018/051392, filed May 22, 2018, which international application was published on Nov. 29, 2018, as International Publication WO 2018/215761 in the English language. The International Application claims priority of Great Britain Patent Application No. 1708210.8, filed May 22, 2017. The international application and Great Britain application are both incorporated herein by reference, in entirety.

TECHNICAL FIELD

The present invention relates to a sensor device and, in particularly but not exclusively, to a sensor that can perform both analogue touch location sensing and digital pressure/force sensing.

BACKGROUND TO THE INVENTION

Tactile sensors provide a way of obtaining information via a physical interaction with the sensor, and are commonly used in applications such as mobile and computing devices, robotics, and control systems. These may operate based on piezoresistive, piezoelectric, capacitive and elastoresistive sensing. For example, in a capacitive touch switch, a person needs merely to touch the sensor, which changes the capacitance within the sensor and triggers the switch. A variety of pressure sensitive materials are now available, including quantum tunneling composites, for use in pressure switching and sensing. These are utilized in soft robotics, heavy machinery and wearables. Examples including conductive inks have been developed to integrate sensitivity into the material itself and create "soft electronics". Three-dimensional (virtual reality) interfaces are also known.

The applicant's earlier application, PCT/EP2016/025067, discloses a sensor device for generating an electrical signal. The device comprises or consists of a planar sheet of electrically conductive material having a three-dimensionally textured surface configured to create a change in said electrical signal in response to movement of a conductive object across the material. Other areas of the material can be of a 3D form, and are mainly used for pressure sensing. The sensed electrical signals from such devices can be used in control applications.

Many different electronic devices require electronic control. Some have an integrated control, e.g. in an electric razor. Others are remotely connected e.g. a wireless computer game controller. A number of different control methods and systems are known, including keyboards, capacitive trackpads, display trackpads, joysticks etc. Most of these interfaces comprise one or more outer injection moulded rigid plastic parts e.g. housings, buttons, keys etc., that act on an underlying biased member such as a spring or soft foam actuation layer which, in turn, acts on a printed circuit board (PCB) underneath to produce, on touch actuation and completion of an electronic circuit, a readable voltage signal.

Such controllers are convenient due to their relatively simple construction and operability, and are widely used. However, they suffer a number of drawbacks. For example, they are predominantly flat and rigid, which limits their use in certain applications. Furthermore, where any buttons, joysticks, keys etc. are provided on/in the controller housing, the gaps between the control features and the housing are prone to entry by water, dust and other contaminants. Certain applications in particular, for example automotive interiors, require good longevity and reliability, and any gaps could permit such contaminants to enter and lead to failure of the electronic circuits housed inside.

Where steps have been taken to address the problem, this has inevitably led to increased costs and complexities. This is often undesirable, particularly in mass produced, low value electronic items and in a commercial marketplace that is already busy and competitive. For example, U.S. Pat. No. 5,510,812 discloses a device that has multiple pieces of conductive foam overlaid on printed circuitry. A filler or other protective material would need to be provided between the foam and printed circuitry, but this would increase manufacturing and shipping costs, as well as increasing raw material demands. This would also necessitate multiple moulding processes during manufacture, leading to said undesirable increased manufacturing costs.

There is therefore a need to provide a sensor device suitable for use in control systems that advantageously provides increased longevity whilst keeping costs of sourcing, manufacturing and shipping down. Aspects and embodiments of the present invention have been devised with the foregoing in mind.

SUMMARY OF THE INVENTION

According to a first aspect of the present invention there is provided a sensor device (or user interactive element) comprising a layer of electrically conductive material. The sensor device may have a layer comprising an electronic connector and/or circuitry. The sensor device may have an insulating barrier provided between the layer of electrically conductive material and the circuitry layer. The insulating barrier may be configured to selectively permit the layer of electrically conductive material to contact the circuitry layer and produce one or more electrical signals.

The sensor device may be configured to produce the one or more electrical signals in response to pressure or force applied to the sensor device urging the layer of electrically conductive material towards the circuitry layer. Alternatively or additionally, the sensor device may be configured to create a change in one or more electrical signals in response to movement of a conductive object thereacross.

Contacting, pressing or moving a finger or an object across the surface causes a detectable electrical signal change. The invention provides a sensor device, having multiple functions including sensing touch pressure, speed and location across the sensing surface. The arrangement of the components of the present invention can advantageously enable the performance of XY touch location sensing and/or Z direction analogue pressure sensing on the same touch area. This significantly enhances touch control interface performance versus currently known devices and methods. The invention provides for sensing continuous capacitance change when touched by an object or human hands. Touching the material grounds it, causing a change in the electrical signal, which can be detected and measured.

Interactions with the conductive material therefore involve movement near and/or across the surface and/or applying a force or pressure to the conductive surface. Force sensing (Z direction) can be achieved by a conductive or non-conductive object urging the layers into contact; capacitive touch sensing (XY direction) is reliant upon a conductive object being near or in contact with the conductive layer.

Force movement in the XY direction can also be detected by a conductive object moving across the surface, and/or a conductive or non-conductive object applying sufficient pressure so contact exists between the conductive layer and the circuitry layer in a plurality of locations across the surface. Therefore, aspects and embodiments of the invention, advantageously offer both location touch (XY) sensing and pressure/force (Z) sensing simultaneously. The conductive layer is used for all sensing measurements, but in differing ways.

The invention further simplifies the process of manufacturing touch sensors and touch sensing interfaces and minimises production costs, by using a uniform conductive material as the interface. Further, the invention enables novel 3D deformable tactile control interface applications. It also facilitates embedding actuators and lighting in an inexpensive way. The prior art can only perform one function at a time—e.g. controllers that perform analogue force sensing cannot also sense touch location on the same area. The majority of known devices only provide a single function e.g. digital on/off buttons, a force/pressure sensor specific to singular electrodes, or an XY location sensing touch surface with no Z axis force sensing. By contrast, and advantageously, aspects and embodiments of the present invention provide multiple functions simultaneously, whilst reducing manufacturing complexities and keeping costs down.

In an embodiment, the sensor device is configured to create a change in said electrical signal in response to movement of a conductive object thereacross and, optionally or preferably, wherein the electrical signal is a voltage or a capacitance and movement of an object across the device causes a change in the voltage or a capacitance. The electrical signal may vary over time and is preferably a voltage or a capacitance and movement of an object across the device and/or pressure or contact with the device causes a change in the voltage or a capacitance. The signal may be a real time value and may be a sequence of values spanning a length of time. Preferably, the electrical signal is monitored over a period of time, and processed to interpret touch location on the device, speed of movement of the object across the surface of the device and/or direction of movement of the object across the surface of the device.

The sensor device may be configured to create an electrical signal in response to pressure or force thereon and, optionally or preferably, wherein the electrical signal is a voltage or a capacitance and pressure on or contact with the three-dimensional form causes a change in the voltage or a capacitance.

The electrically conductive material may be or comprise a flexible, deformable or pliable material.

The conductive layer is preferably in the form of a generally planar sheet of material. The electrically conductive material may be or comprise a soft silicone rubber material comprising an electrically conductive material such as graphite. A foam, such as a polyurethane based foam or other foam could be used instead.

The electrically conductive material may be deformable, upon pressure or force applied thereto, to make contact with the circuitry layer through one or more of the apertures of the isolation layer.

The sensor device may be configured to provide analogue X and Y touch position sensing and/or Z-direction pressure/force sensing.

The sensor device may be configured to provide a change in the one or more electrical signals in response to contact being made between the electrically conductive material and the circuitry layer. Alternatively or additionally, the sensor device may be configured to provide a change in the one or more electrical signals in response to a change in the distance between the electrically conductive material and the circuitry layer.

The sensor device may be configured to provide a change in the one or more electrical signals in response to a conductive object being in contact with or within a pre-defined range of a surface of the electrically conductive material, and optionally or preferably, the conductive object applying pressure to the electrically conductive material.

The electrically conductive material may be arranged as a touch interface layer.

The electrically conductive material may be formed, optionally or preferably by moulding, to comprise one or more user interactive areas, optionally or preferably in locations corresponding to locations of apertures in the isolation layer.

The user interactive area may be a push or click button formed in or on the electrically conductive material, and comprising one or more of a projection, recess or insert configured to contact the circuit when pressure is applied thereto. One or more user interaction devices may be provided on or in the electrically conductive layer. The one or more user interaction devices may be formed (e.g. moulded) in the electrically conductive layer and may be formed of the same material. Additionally or alternatively, the one or more user interaction devices may be separate components, and the electrically conductive layer may be formed to accommodate or house the one or more user interaction devices. For example an inverted dome may be provided to provide a "click" switch functionality when pressed by a user. Alternatively/additionally, LEDs, an illumination layer, vibration feedback etc. may be provided. The invention therefore offers a unique combination of features of mechanical switch bundles and analogue pressure sensing using a seamless, uniform and deformable material as an interface.

This arrangement advantageously avoids multiple moulding processes of the conductive material as are required in the prior art, and therefore minimises production costs.

The layer of electrically conductive material may comprise a 3D profiled or textured surface configured to create a change in said electrical signal in response to movement of a conductive object thereacross.

The three-dimensionally profiled surface may be textured e.g. with a regular or irregular geometric pattern. The geometric pattern may be formed by a variation in elevation and/or depression across the surface of the electrically conductive material. The geometric pattern may comprise a plurality of discontinuities and/or undulations. The geometric pattern may comprise a plurality of peaks and troughs across the surface in a pattern. The geometric pattern may be configured so as to provide a change in electrical signal when subjected to a movement of a said object in a direction across the pattern.

A non-conductive coating or layer may be provided on the layer of electrically conductive material. This layer may be a non-conductive silicone, or a Thermoplastic Polyurethane, or another Thermoplastic Elastomer moulded, coated, sprayed, laminated or placed on top of the conductive material.

In an embodiment, the circuitry layer is or comprises a printed circuit board and, optionally or preferably, is a flexible printed circuit board.

The sensor device may comprise one or more areas of printed conductors. These may be provided in locations corresponding to locations of apertures in the isolation layer.

The one or more printed conductors may comprise one or more of a resistor element, an array of resistive lines and a touch sensing location. The resistive lines may be produced through a "screen printing" method, where a conductive ink e.g. carbon black can be applied onto the printed conductors. The length, shape and width of the resistive lines may be configured to produce a difference in the electrical resistivity along/throughout their trajectory.

In an embodiment, a sensor may have an array of resistive lines with multiple electrodes. Each resistive line may have one electrode. When a user touches or moves their finger or an object across the conductive surface, any electrodes that are activated can be identified within an approximate range. This can be achieved by identifying the touch in the X direction by seeing which electrode(s) of the array, and their respective connected traces, show a detectable signal change. Reading the real-time value of the signal from the activated electrode(s) caused by the difference in the resistivity of the resistor traces applied on the electrodes throughout its full length can position the touch in the Y direction. The signals can be smoothed to prevent mis-readings. Due to the analogue nature of the signals, touch XY position resolution can be increased by approximating in-between values. Multi-touch function can also be implemented by separating two readings happening simultaneously. Such sensor devices may in particular be used for XY touch location and/or zooming control functions.

The printed circuitry layer is preferably a flexible PCB. It may comprise one or more conductive (e.g. metal/wire) traces exposed/unconnected at a first end, and arranged to be able to make contact with the conductive material layer to complete an electronic circuit. The traces may be connected at their other end to a sensor or controller e.g. a capacitive sensor/controller or piezoelectric sensor/controller.

Embodiments of the invention provide for both single point and multiple point sensing. Embodiments of the invention provide for sensing touch position, touch pressure, movement speed, movement direction and touch location or proximity to a measurement sensing location.

The isolation or separation layer may be formed or comprise a non-conductive material to prevent an electrical short circuit between the layer of electrically conductive material and the circuitry layer.

The insulating barrier, e.g. an isolation or separation layer, provides a barrier or permanent separation in non-sensing areas since it prevents the conductive layer coming into contact with the flexible FPC layer to complete an electronic circuit. The separation layer does, however, enable the conductive layer to be urged into contact with the FPC layer upon actuation (pressure) applied by a user to make contact and complete an electronic circuit where there are apertures in the separation layer. The localised contact provided at/through the separation layer apertures therefore enables sensing modularity and resolution. It also significantly increases the signal change range in the intended touch area while being touched versus not being touched. It also advantageously enables some rare use-cases where the user may be wearing gloves or the contact is made by a non-conductive object. In these rare scenarios the press action can still cause contact between the conductive layer and the FPC layer to produce signals. The apertures may take any form as required by the particular application. They may, for example, be circular, oval/elliptical, elongate slots, slits, square, or any other suitable shape.

According to a second aspect of the present invention there is provided a method of using the sensor device of the first aspect, as defined in claim 16.

According to a third aspect, there is provided a method of sensing an electrical, the method comprising using a device comprising a layer of an electrically conductive material and a layer comprising an electronic connector and/or circuitry. The method may further comprise selectively making contact therebetween dependent on bringing the electrically conductive material and circuitry layer into contact. The method may further comprise any one or more steps corresponding to the features discussed in relation to the first aspect.

According to a fourth aspect there is provided a computer program configured to, when executed, cause a computing device to perform the method according the second or third aspect, as defined in claim 18.

The computer program may be further configured to, when executed, cause a computing device to detect touch position, touch pressure, movement speed, movement direction and proximity to a measurement sensing location by processing the electrical signal. The computer program may contain instructions to process signals over a period of time and calculate, from variations or characteristics in the signal, the location of touch on the device, the pressure exerted on the device, the speed of movement of the object across the surface and/or the direction of movement of the object.

According to a fifth aspect there is provided a system comprising the sensor device of the first aspect and the computer program of the fourth aspect configured to execute on a computing device, as defined in claim 20, the sensor device being electrically connectable to the computing device.

The device may be connected to a computing or processing device. This is intended to be construed broadly, and to cover personal and mobile computing devices as well as other intelligent devices comprising a processing means such as a television controller, gaming console controller, on-board vehicle control systems and the like.

The computing or processing device may be configured to host instructions for enabling processing of the output signal from the device. The system may have an input/output data interface. The system may include a processor, a storage device, and a non-transient machine-readable storage medium. The machine-readable storage medium may include instructions which control how the processor receives input data and transforms the input data (the electrical signal) into output data e.g. on the screen, a connected printing device or via an audio output. The machine-readable storage medium in an alternate example embodiment is a non-transient computer-readable storage medium.

The sensor device may be connected to a signal processing means via one or more wires or electronic connector(s) or a USB port or wireless technology. The wireless technology may be Bluetooth, WiFi, IR, etc.—a simple electrical signal carried on wire(s) to an input signal readable by the computer via the USB port or wireless technology. The output signal is preferably a time varying electrical signal such as a capacitance or voltage reading. In a first or starting state, the capacitance or voltage reading may be constant. However, when a person touches the conductive material e.g. with their finger or a suitable stylus etc., the capacitance or voltage at the point or area of contact on the surface changes, causing a change in the electrical signal output. The computer program may be configured to display the signal and/or information representative of that signal and/or provide an interaction with a software application caused by the signal.

In an embodiment, a computer program is provided which, when run on the computing or processing device, causes the computer to perform any method disclosed herein.

The computer program may be a software implementation, and the computer or device it runs on may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software implementation may be an assembly program.

The computer program may be provided on a computer readable medium, which may be a physical computer readable medium, such as a disc or a memory device, or may be embodied as a transient signal. Such a transient signal may be a network download, including an internet download. In some aspects and/or embodiments, if a person moves their finger near or on the conductive surface, the capacitive signal graph simulates the touch/movement. An initial signal sequence through a short period of time may be sampled to interpret touch location, then the real-time signal can simulate pressure sensing. In other aspects and/or embodiments, when a person moves their finger across a textured three-dimensional surface, the capacitance signal graph resembles or approximates or can be interpreted to describe the geometry condition. The geometry can be modelled in CAD software and then put into a parametric program (e.g. grasshopper) to adjust the teeth angle, height and density. The signals are thus repeatable and programmable such that the software is able to compare a measured signal with a pre-modelled signal waveform and, where there is a match, indicate information to a user such as the location of touch on the material surface, the direction of movement across the surface, the pressure or force a person uses etc. Other algorithms may also be used to detect the movement direction, touch speed and position. For example, the movement speed can be calculated by calculating the distance between the signal change peaks frequency. Movement direction can be detected by comparing the peak value changes, and location can be detected based on the relative displacement. Here, the user does not have to finish the swiping motion on a single texture unit to interact.

The computer program may be configured to, when execute, carry out the method(s) or processes described herein.

"Computer program" as referred to here and elsewhere in the specification refers to a program operable to run on a computer or other processing device e.g. a mobile phone (including an iPhone), a tablet (including an iPad) etc.

"Three-dimensional" as used herein can refer to a texture or profile provided on a surface, planar or otherwise, and/or to a non-planar surface or shape.

The material may be connected to a computing or processing device. This is intended to be construed broadly, and to cover personal and mobile computing devices as well as other intelligent devices comprising a processing means such as a television controller, gaming console controller, on-board vehicle control systems and the like.

The computer program may be configured to, when execute, carry out the method(s) or processes described herein.

Features which are described in the context of separate aspects and embodiments of the invention may be used together and/or be interchangeable wherever possible. Similarly, where features are, for brevity, described in the context of a single embodiment, these may also be provided separately or in any suitable sub-combination. Features describes in connection with the device may have corresponding features definable with respect to the method(s) and the computer program and these embodiments are specifically envisaged.

BRIEF DESCRIPTION OF THE DRAWINGS

Embodiments of the invention will now be described with reference to the Figures of the accompanying drawings in which:

FIGS. 1, 2, 2a, 2b, 4 and 5 show sensor devices according to different embodiments of the invention;

FIGS. 15-19 show different resistive traces that can be used on the printed circuitry layer;

DETAILED DESCRIPTION OF EMBODIMENTS OF THE INVENTION

Figure 21:
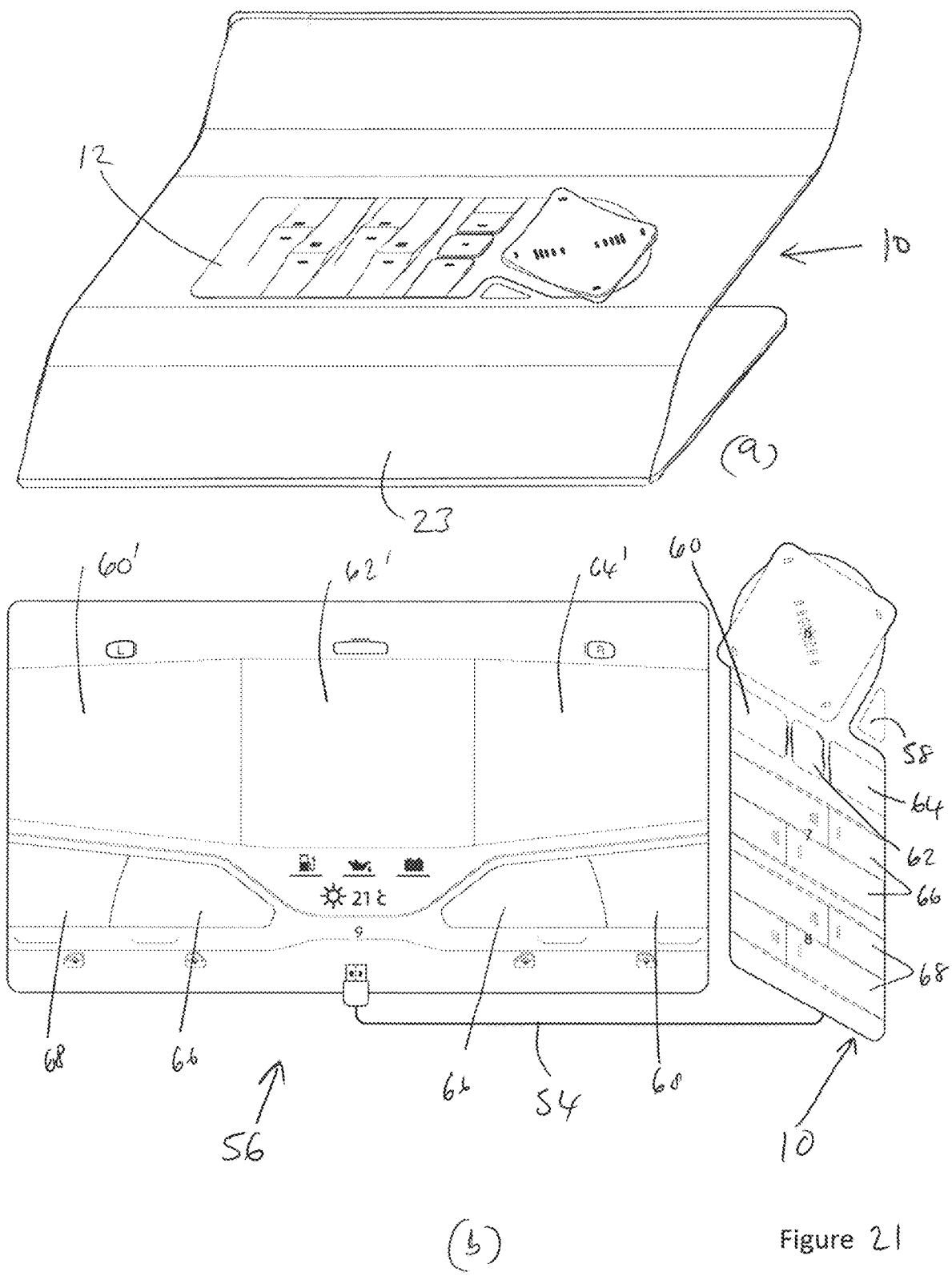
FIG. 21 shows an example of an embodiment of the invention in use in an automotive interior.

FIG. 1 shows a sensor device or user interactive element 10. The sensor device 10 comprises a layer or portion of electrically conductive material 12. The sensor device also has a circuitry layer 14 and a barrier, preferably in the form of a separation or isolation layer 22 between the layer of electrically conductive material and the circuitry layer. The whole device 10 can be configured to fit in or on top of an existing counter-part, e.g. a car interior door panel (as shown in FIG. 21, discussed below). It is to be appreciated that whilst it is necessary for the conductive layer 12 to be adjacent to the separation layer 22 and for that to be adjacent to the circuitry layer 14, these need not be flat layers.

The conductive layer 12 is provided in the form of a generally planar sheet 12. The conductive material 12 is pliable, deformable and/or flexible. The conductive material 12 may be formed of a silicone rubber containing conductive material such as conductive metal particles and optionally carbon filler. In an embodiment the material is silicone rubber mixed with graphite. A possible alternative is rubber and/or TPU (thermoplastic polyurethane) or TPE (thermoplastic elastomer) which is, or could be, advantageously, recyclable. The material can have a range of hardness properties (depending on the silicone base) with controllable conductivity (depending on the graphite ratio). The electrically conductive material may also comprise a stretchable fabric layer and/or electrically conductive paint e.g. on one of its sides.

The conductive layer 12 may be or be formed of a single material, and/or formed from a single moulding without needing any assembly of parts. A coating or moulding e.g. a non-conductive coating may be applied to all of part of the conductive layer 12. A non-conductive material layer (TPU, TPE, non-conductive silicone, fabrics, leather) can be moulded/sprayed/laminated on top on the conductive material layer 12 to function as a protection layer, and/or to perform better touch sensations.

The conductivity of the material 12 can vary across and through the material 12. In other words, the conductivity of the unitary piece of material can be modulated. This can be achieved by varying the concentration of the conductive component within the material 12 so as to provide areas of different conductivities. This may also be achieved by modulating conductive components or separating conductive areas (e.g. applying conductive materials to separated areas on one piece of fabric material). Areas of different conductivities will produce a different electrical signal. As such, even if two areas of a material 12 were profiled in the same way, if these areas had different conductivities, moving an object across their surfaces would generate different electrical signals enabling them the be distinguished. In this alternative/additional way, the location of the moving finger/object on can be detected. The device may comprise, in part, non-conductive materials. This could be used e.g. where only pressure-sensing is desired e.g. for an on/off switch. Embodiments of the invention can therefore provide one or more areas of relatively higher or lower conductivity, zero or near-zero conductivity as compared with the rest of the material.

The deformable conductive material 12 can be moulded in a particular 3D profile as required for a particular application. This beneficially facilitates a user's experience of using the device 10.

The profile of the surface 12 may have a height that varies across the surface or extent of the material 12. The surface of the layer 12 may be profiled with areas that each comprise three dimensional or non-planar features. The surface of the sheet 12 may therefore be configured, at least in part, to have a three-dimensional geometric texture relative to the surface of the sheet 12. The textured surface can be used to provide tactile feedback when manipulated or touched by a person. The texture may be provided by one or more troughs and/or undulations. In use, a user's finger or object moving across the surface causes a change in the electrical signal produced by the conductive material and that change can be detected and translated into a signal to control an electronic device/system e.g. a volume, movement or lighting control. Examples of this are shown and discussed in relation to FIG. 20 below.

In another embodiment, if a person moves their finger across a textured area of the conductive material 12, software would be able to match the observed time varying signal with a pre-stored profile to identify the particular area that is being activated as opposed to any other area. The software can be programmed to provide a visual indication on a display to show activation at a virtual location on the screen that mirrors the activation on the physical material 12. The material 12 is pressure sensitive. Pressing harder on the material 12 will result in a larger change in the capacitance signal. The software can be configured to show a larger or more pronounced virtual indication corresponding to that larger output. The material 12 can, therefore, be used in a system to provide touch location and movement determination.

In an embodiment, the conductive layer 12 is formed (e.g. moulded) to have a projection 20 on the contact face of the conductive layer 12 that faces the circuitry layer 14. The projection may comprise a hollow structure 20a can be configured to accommodate an additional actuation element.

An alternative embodiment is shown in FIG. 2a. Here, a hollow or recess 20a is formed in the conductive layer 12. An activation member such as a dome 42 (see FIG. 3) e.g. formed of metal is provided within the hollow/recess 20a. When a user presses down on the conductive layer 12, and onto the activation member 42, the metal dome 42 may provide a click bounce feedback when touched or pressed. The encapsulation of the dome 42 forces it to invert and produce a "click" sound, and the arms 20b surrounding the recess 20b are urged into contact with the circuitry layer 14. FIG. 2b shows an alternative arrangement, where the activation area is raised above the surface of the conductive material 12 to form a button, and a projection 20, 20b is formed on the opposite surface of the conductive layer 12.

Figure 3:
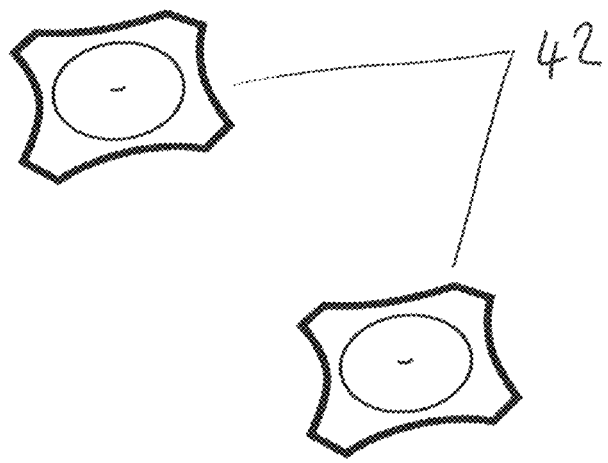
FIG. 3 shows example user interactive components.

FIG. 3 shows examples of such additional actuation elements 42 that can be embedded in the conductive layer 12. Such actuation elements may be embedded in the conductive layer 12 to achieve functions such as click feedback, vibration feedback and lighting feedback. Use of a uniformly moulded conductive layer 12 material advantageously means no addition assembly parts need to be created in order to fit the additional components 42.

A metal dome (e.g. as shown in FIG. 3), or an LED and its lens, or a vibration actuator, can be easily integrated by over-moulding them in the same production procedure, or by reserving an appropriate negative space for placement therein. Where a vibrating device is used, since the conductive material 12 it is mounted in is soft, the vibrations tend to be localized and do not spread through the material/across the device 10.

Other actuation mechanisms may also/instead be provided in the device in a similar way. For example, components such as one or more LEDs can be embedded within the conductive layer 12 to illuminate icons provided on/in the surface of the conductive layer 12 and/or a vibration motor may be provided. Additionally/alternatively, an additional actuation layer can be embedded in/under the conductive material, e.g. a piezoelectric vibration layer or an illumination layer.

Advantageously, the softness of the moulded conductive material 12 provides active tactile feedback or visual feedback without adding separately moulded parts or assemblies. Furthermore, whereas a single piece of rigid material, as is traditionally used in such control devices, would not permit such actuation, the use of a flexible material and optionally the actuation structures/substructures provides for touch actuation without the need for multiple moving parts.

Symbolic profiles for graphical information can also be provided/imprinted on the conductive layer 12 to enhance the user experience and to indicate where the controls are.

The sensor device 10 further comprises a layer of electronic circuitry 14, preferably a flexible printed circuit (FPC) layer. The FPC layer 14 comprises one or more conductive (e.g. metal/wire) traces exposed/unconnected at a first end 16, and arranged to be able to make contact with the conductive material 12 to complete an electronic circuit. The traces are connected at their other end 18 to a sensor or controller e.g. a capacitive sensor/controller or piezoelectric sensor/controller. A conductive substrate (see e.g. FIGS. 14-18 and discussed further below) may be provided on the exposed section of trace wires. (In a typical FPC production process, the traces are coated leaving only areas (unconnected ends 16) that are intended for applying conductive substrate upon exposed (the dark/shaded parts of FIG. 8).) The conductive substrate may be screen printed or digitally printed onto the exposed wire traces. The electrical conductivity of the conductive substrate 14 needs to be carefully selected and/or monitored by choosing the correct material and/or modifying conductive content proportions in the conductive print/ink material. Since the sheet resistance could range from 10 to 1000 Ohm/sq with a thickness of 1-200 microns, this is needed to enable the largest (or at least a measureable) change of conductivity between the ends of the traces.

Between the conductive layer 12 and the FPC layer 14 is interposed an isolation or separation layer 22. The separation layer 22 can be a thin substrate sheet or an adhesive or coating layer applied directly on top of the FPC layer 14. It may be or comprise non-conductive silicone, a thermoplastic polyurethane, or a thermoplastic elastomer moulded, coated, sprayed, laminated or placed on top of the conductive material. It can be constructed to match the overall shape/outline of the FPC layer 14. The separation layer is constructed with one or more apertures or cut-outs. The separation layer 22 may be formed from a laser-cut acetate sheet, or may be chosen from a wide range of cut sheet materials. The thickness can vary dependent upon the functionality requirement, e.g. the force required to perform a switch function. The separation layer 22 provides a barrier or permanent separation in non-sensing areas since it prevents the conductive layer 12 coming into contact with the flexible FPC layer 14 to complete an electronic circuit. The separation layer 22 does, however, enable the conductive layer 12 to be urged into contact with the FPC layer 14 upon actuation (pressure) applied by a user to make contact and complete an electronic circuit. In an un-pressed state, even in an area where there is an aperture in the separation layer 22, the thickness of the separation layer 22 is sufficient to keep the conductive layer 12 and the FPC layer 14 separated and electrically unconnected. When a user presses the conductive layer 12 in an area where there is an aperture in the underlying separation layer 22, the conductive layer 12 is urged into contact with the FPC layer 14 to make an electrical connection.

Whilst it is convenient for the barrier 22 to be an insulating/dielectric layer with apertures, one or more barrier elements could instead be provided between the conductive layer 12 and the circuitry layer 14, where conduction between the surrounding layers 12, 14 can occur where no barrier element is present.

Figure 2:
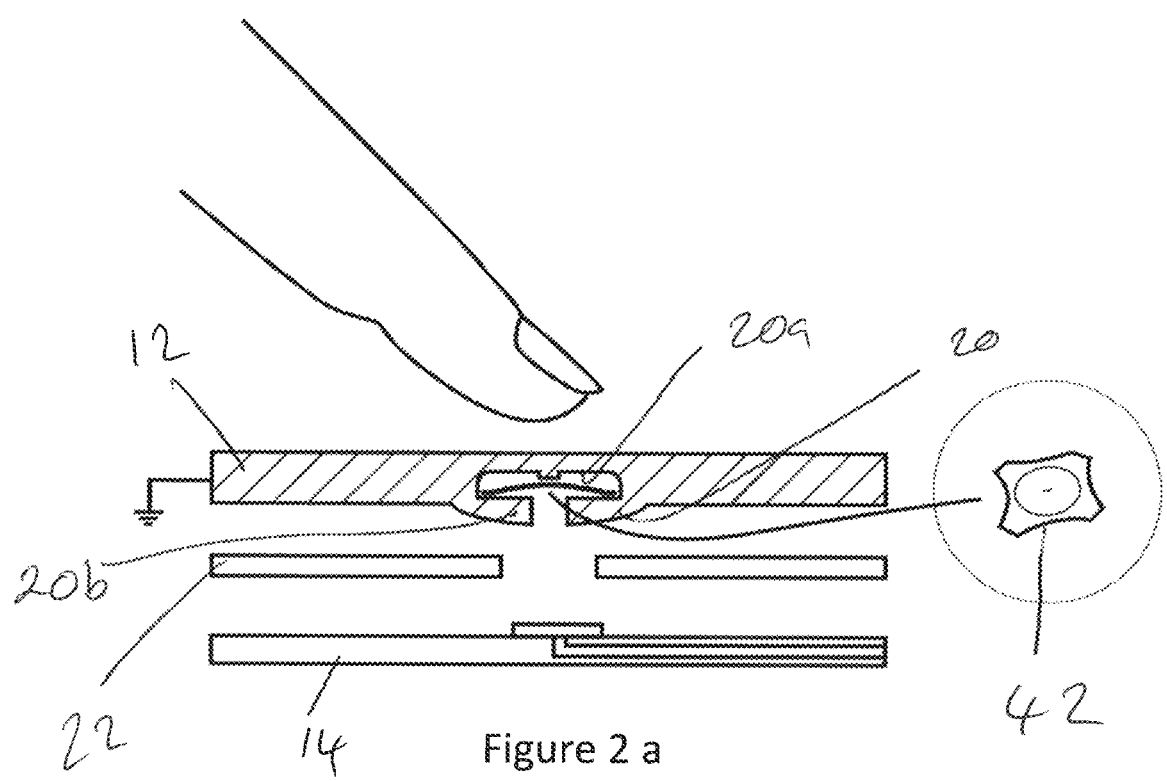
Figure 2:
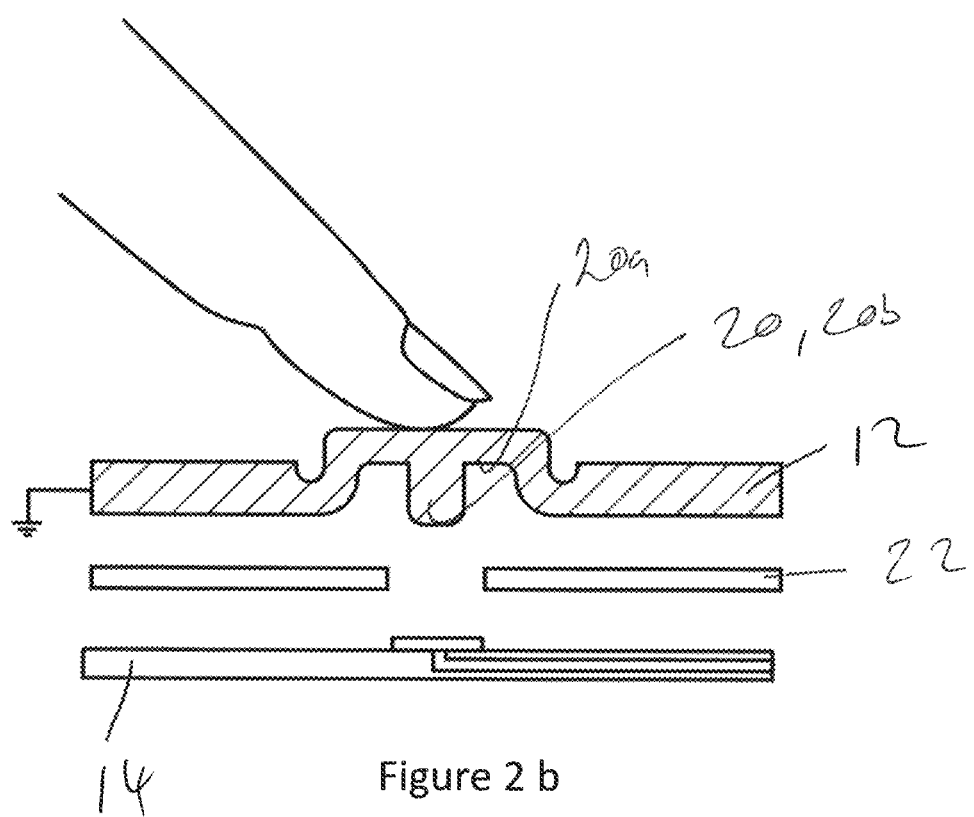

In FIG. 1, the conductive layer 12 is coupled to ground and the FPC layer 14 is coupled to an electrode. FIG. 2 shows an alternative embodiment in which the conductive layer 12 is coupled to an electrode and the FPC layer 14 is coupled to ground.

Figure 4:
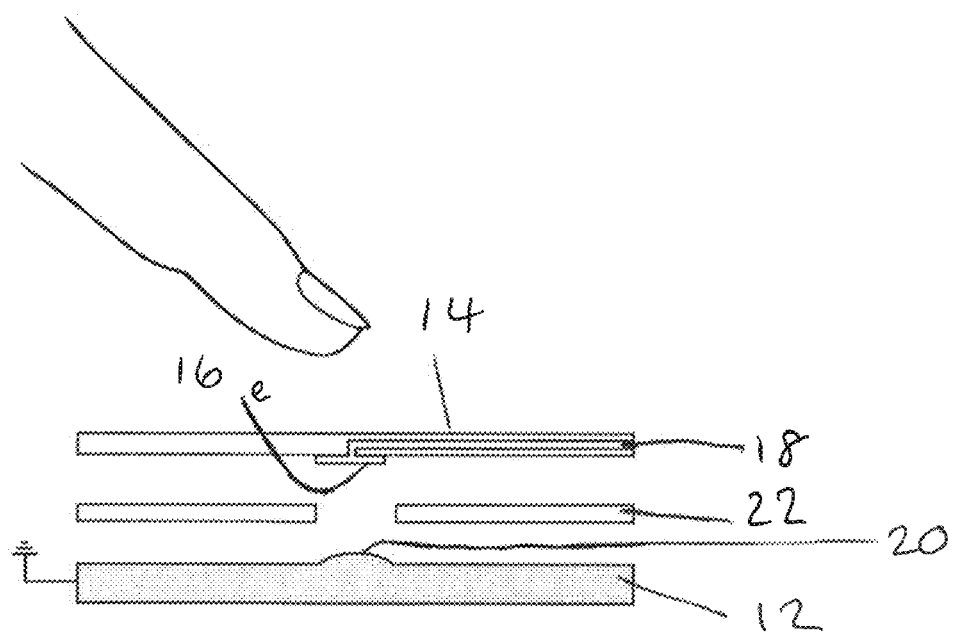
Figure 5:
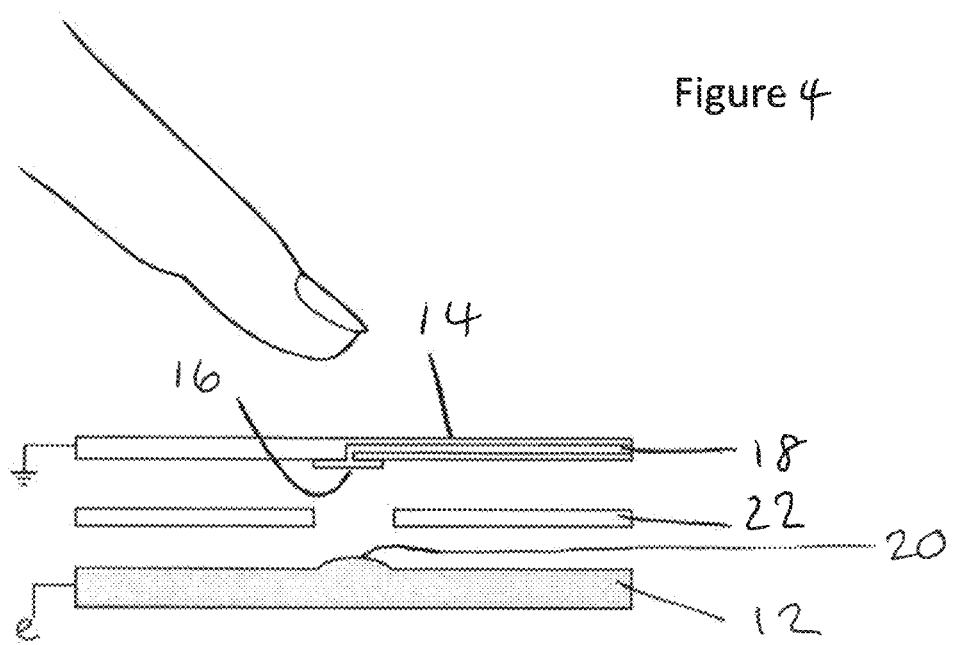

In the embodiments of FIGS. 1 and 2, the sensor device 10 is configured for a user to urge the conductive layer 12 towards the FPC layer 14. In an alternative embodiment, the sensor device 10 could be configured for a user to urge the FPC layer 14 towards the conductive layer 12, e.g. as shown in FIG. 4 or 5 (equivalent to FIGS. 1 and 2 respectively, but with the conductive layer 12 and FPC layers reversed).

As such, the conductive interface material 12 can be grounded to complete the circuitry. Alternatively, the conductive interface material is connected to a separate electrode serving as a reference point or an independent sensor itself. The electronic hardware set-up can comprise a capacitive sensor controller and/or a piezoelectric sensor controller using or driven by low voltages.

FIGS. 6a and 6b respectively show perspective and plan views of an example conductive layer 12. The conductive layer 12 is moulded to comprise a plurality of different control interfaces (or there could be just a single one). Any one or more of each type (or control) interfaces can be provided. In the embodiment shown, a directional control 24 is provided. There are also three switch buttons 26 and eight soft push buttons 28.

In an embodiment, an injection moulding process is used to produce a conductive silicone compound from which the conductive layer is formed. This advantageously enables the production of a touch control interface 10 with a 3D profile in a one-part uniform material 12. In another embodiment, a non-conductive material e.g. TPE, or a non-conductive coating can be applied to the conductive material to allow customised colours and finishes. This does not prevent any modulation of the conductive material to achieve a certain structure or certain properties, or other manufacturing processes so long as the material property satisfies certain conductivity and 3D profile characteristics. In another example, an additive manufacturing method can be employed using 3D printers in comparatively smaller quantities. The conductive interface material 12 then gets attached to a coated or separated flexible printed circuitry layer 14 to form the final device 10.

Figure 7:
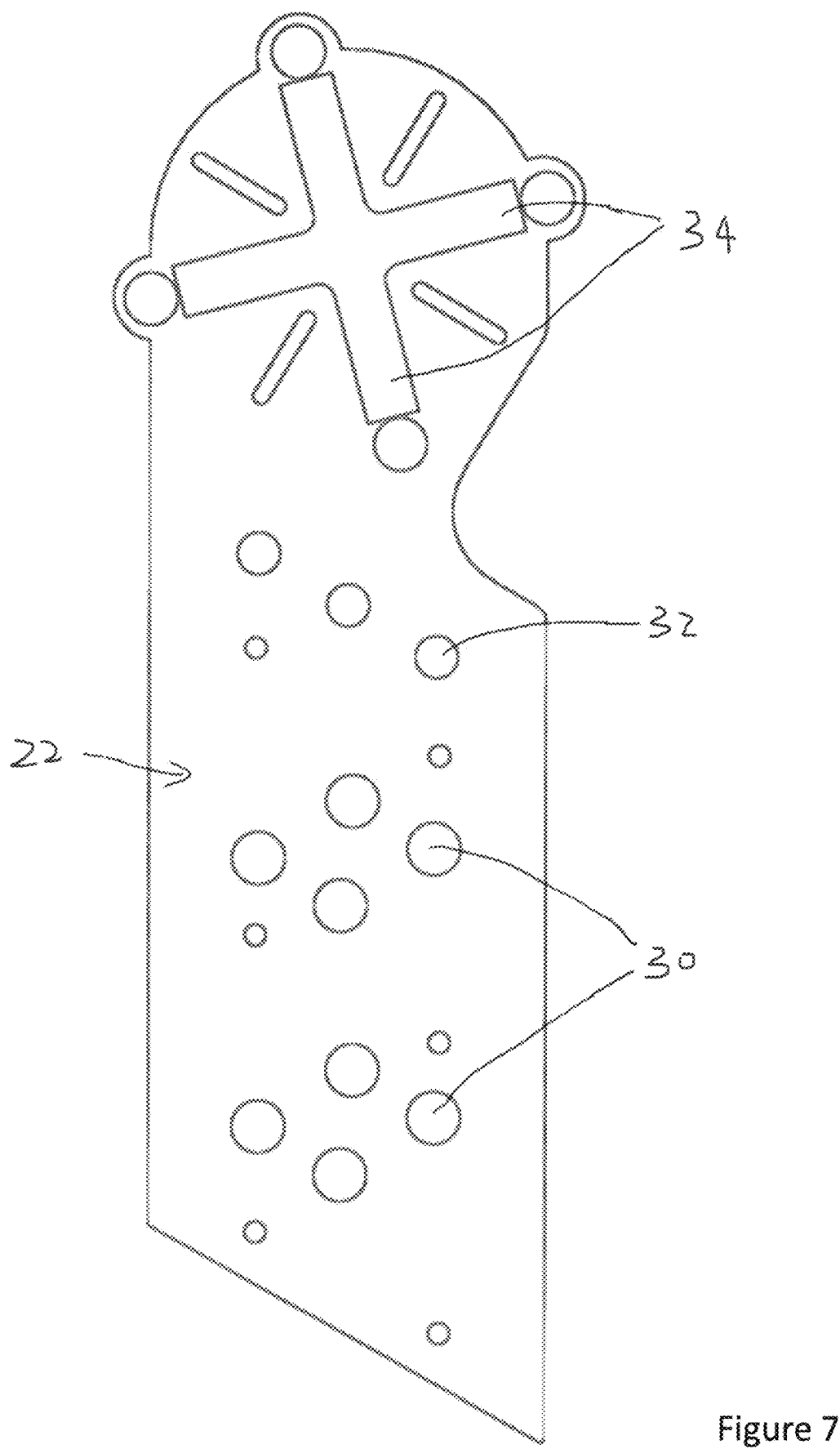
FIG. 7 shows an isolation layer.

FIG. 7 shows an example separation layer 22. The separation layer 22 is formed of a non-conductive material. It comprises a number of apertures 30, 32, 34. The apertures 30 on the left hand side of the figure are circular apertures 30. These are for selectively permitting the conductive layer 12 to be urged into contact with the FPC layer 14 when a user operates the slide controls 28. A series of three apertures 32 are also provided for selectively permitting the conductive layer 12 to be urged into contact with the FPC layer 14 when a user operates the buttons 26. Larger, elongate apertures 34 are provided within the separation layer 22 for selectively permitting the conductive layer 12 to be urged into contact with the FPC layer 14 when a user operates the directional control 24.

Figure 8:
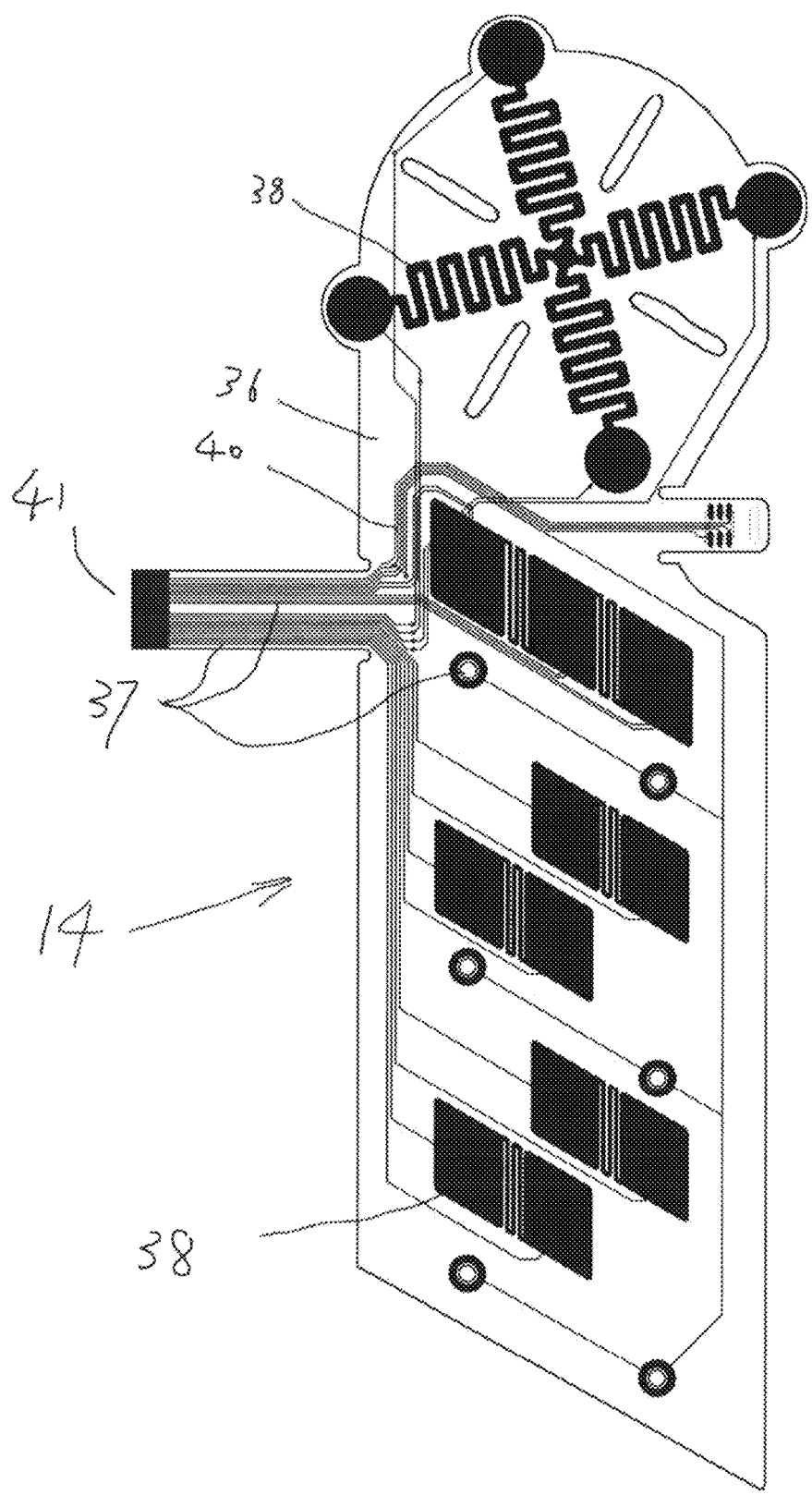
FIG. 8 shows a printed circuitry layer.

FIG. 8 shows an example FCP layer 14. The FPC layer 14 comprises a flexible base 36 e.g. an insulating/dielectric film/acetate. Areas of conductive material 38 e.g. a conductive metal or a carbon-based compound ink are provided in locations on the base 36 corresponding to the apertures 30, 32, 34 of the separation layer 22. The conductive areas 38 are connected to each other and/or to other electronic components via conductive traces 40. The FPC layer can be connected to a touch sensor controller via one or more electrodes 41 and/or conductive traces 37. The shape and the layout of the printed substrate layer 14 can be specifically designed for the intended purposes of the whole interface 10. By varying the length, width, density, thickness and patterns of the conductive areas 38 on the printed conductive substrate 14, the resistance of the substrate can be manipulated to produce rich touch information as will be discussed below. Conveniently, the conductive areas 38 are screen printed on to the film 36.

Figure 9A:
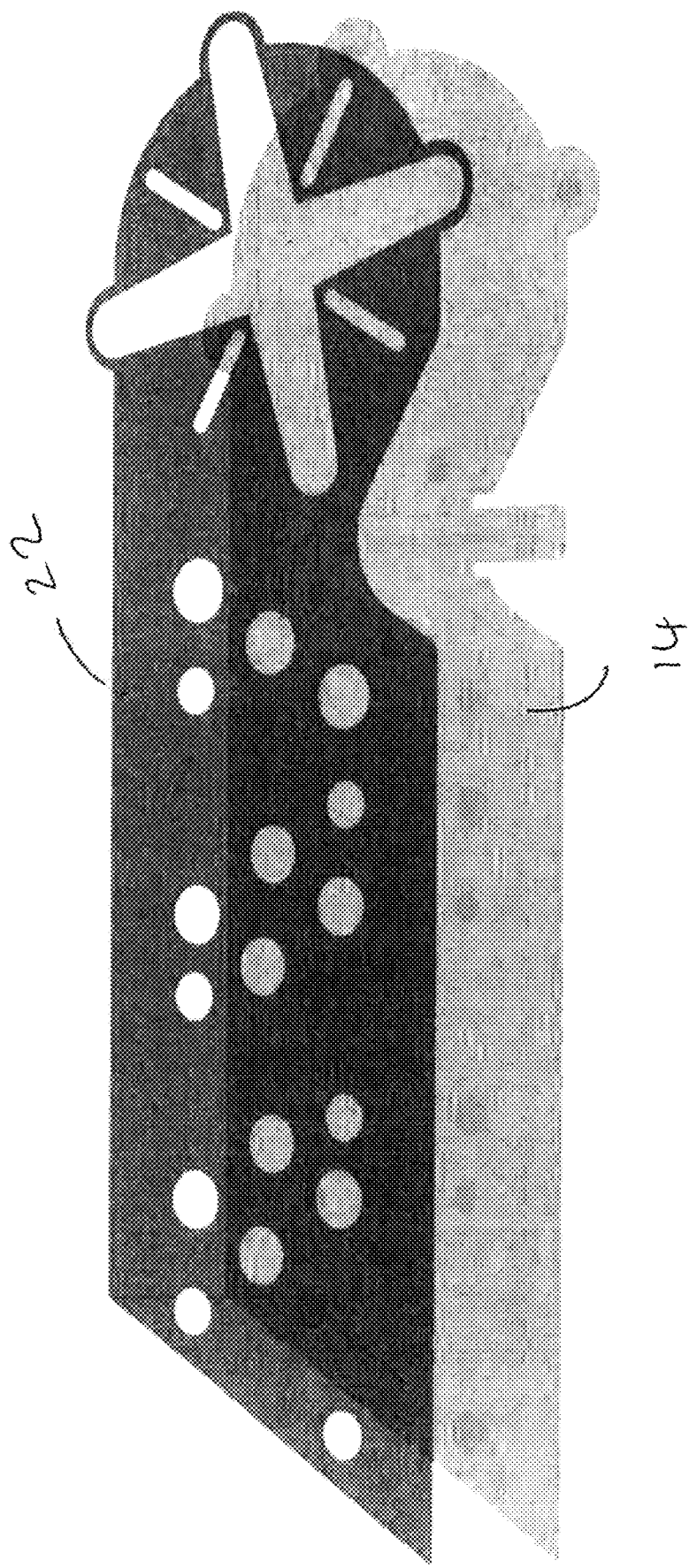
FIG. 9a shows an isolation layer and a printed circuitry layer.
Figure 9B:
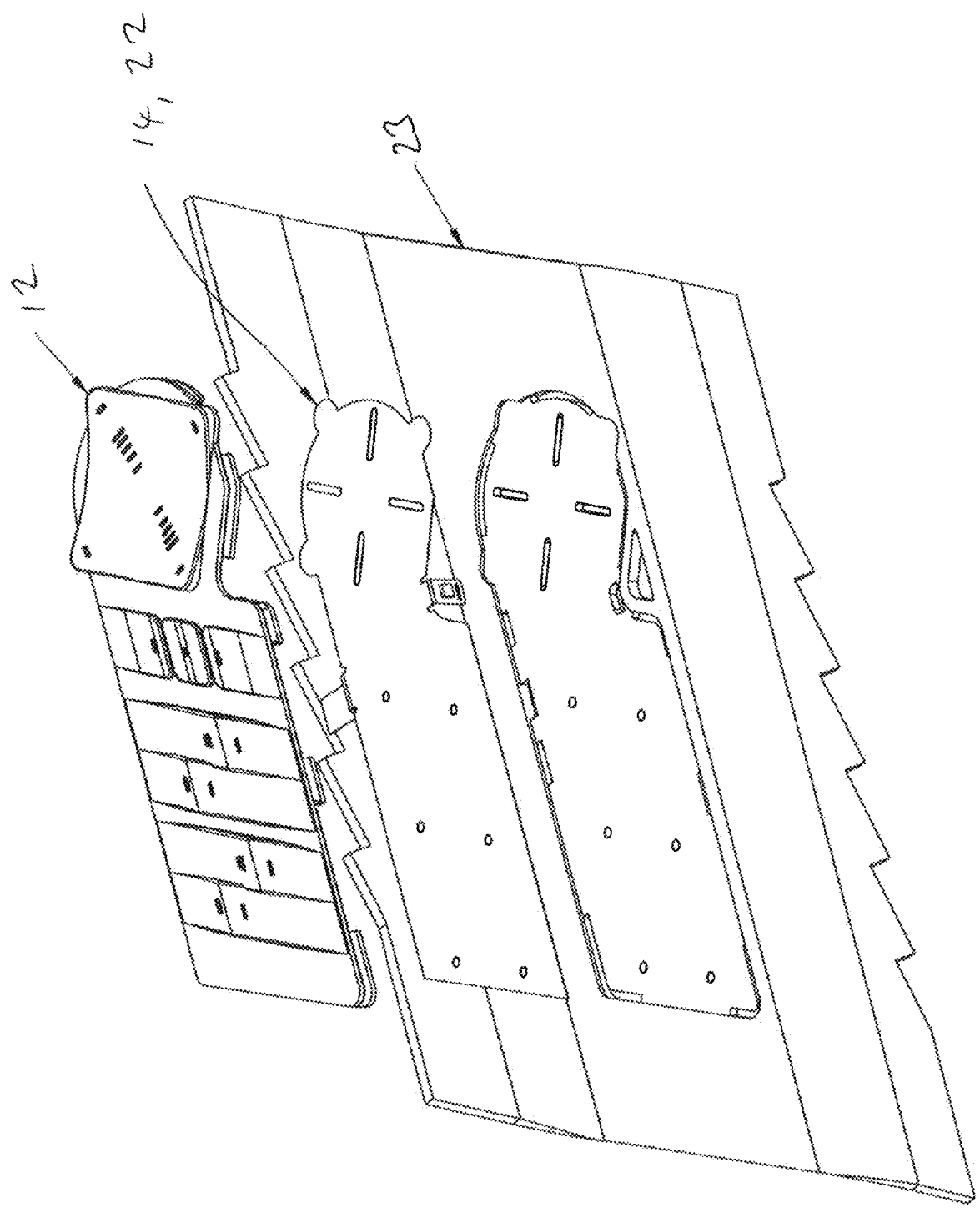
FIG. 9b shows a layer of electrically conductive material, an isolation layer applied on a printed circuitry layer and a base.

The shapes or perimeters of each of the conductive layer 12, separation layer 22 and FCP layer 14 preferably all correspond or are substantially the same. FIG. 9a shows the shape correspondence between the example separation layer 22 of FIG. 7 and the FPC layer 14 of FIG. 8. FIG. 9b shows the shape correspondence between the example conductive layer 12 of FIG. 6, the example combination of FPC layer 14 and separation layer 22 of FIG. 9a and a base or support 23 in which the sensor device 10 is mounted.

The ability to sense when a user/object presses the conductive layer 12 and makes contact with the FPC layer 14 provides for force/pressure sensing, i.e. sensing in the vertical or "Z" direction, has been discussed above. The discussion below explains how touch sensing is performed. Touch sensing provides a reading where point contact or moving contact is made on the surface, i.e. in the horizontal or XY direction. For touch sensing, when a user places one or more fingers or one or more conductive objects into contact with and anywhere on the interface material 12, and/or hovers their finger(s)/the object(s) over the interface 12 within a certain range, an analogue capacitive signal is produced. The contact need only be slight—it need not exert any pressure upon the surface 12. The capacitive signal may vary from a high value to a low value, correlating to amount of contact extent. Furthermore, the sensor device 10 can be operated even when the user is wearing gloves.

Figure 10:
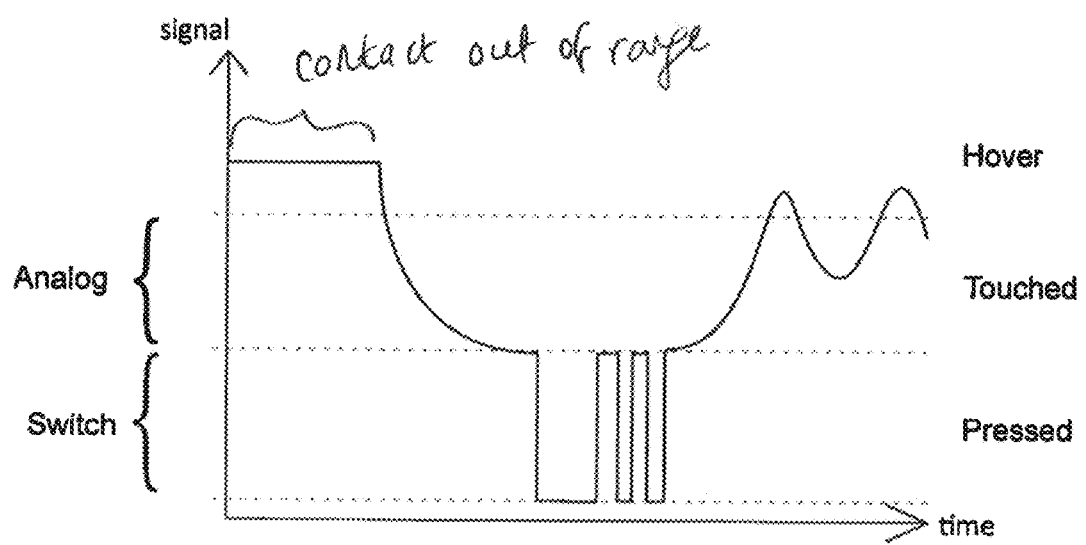
FIG. 10 shows a plot of an electrical signal sensed from a sensor device versus time.

Referring to FIG. 10, no signal will be generated when the user's finger(s)/conductive object are out of range (left hand most part of the plot). When one or more fingers or one or more conductive objects approach or touch an area on the conductive interface material 12, an "analogue" capacitive signal can be read that is proportional to the contact extent/pressure exerted by the user. This is represented in FIG. 10 as a gentle curve.

When the user's finger is fully touching and slightly pressing the conductive layer 12 to an extent that the material 12 deforms and gains contact with the FPC layer 14, the gap in the separation layer 22 that is defined by the aperture is filled, and the signal reading "jumps" as the circuit is completed. This, in effect, provided a "digital" reading. In a similar manner, a metal dome inserted in the conductive layer 12 deforms, providing a click press feedback.

Referring again to FIGS. 1-4, only when a user presses the conductive layer 12 down with sufficient force will it contact the FPC layer 14 and produce a digital or switch signal. When a user just hovers or lightly contacts the conductive layer 12, the analogue signal is produced as discussed above.

Figure 11:
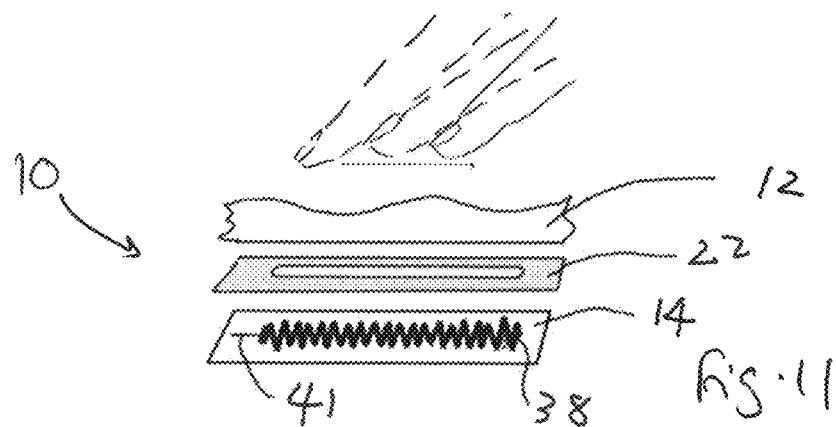
FIGS. 11 to 13b show different sensing arrangements together with the corresponding signal versus time plots.

The present invention also provides a solution for touch direction sensing with one or a number of electrodes. FIG. 11 shows an exemplary device 10 having a conductive layer 12, a separation layer 22 and a FPC layer 14. Electrodes/traces 41 and a resistive pattern 38 suitable for the intended application are printed onto the FPC 14 in the appropriate areas.

When a user slides their finger or an object across certain areas on the conductive interface material 12, sufficient to urge the material 12 to deform and contact the FPC layer 14 where there is a gap in the separation layer 22 permitting that contact, a changing signal can be detected. The printed electrodes/traces 41 and resistive pattern 38 printed on the FPC layer 14 are designed such that when the contact point moves across the pattern, it creates a recognisable signal trajectory to describe the movement of the user's finger/object. Specific printed electrodes/traces 41 and resistor pattern 38 printed on the FPC layer 14 will be discussed in more detail below.

Figure 12:
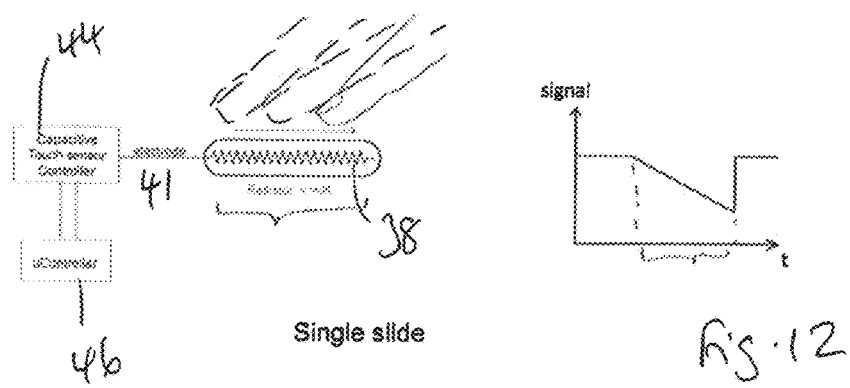

FIG. 12 illustrates touch direction sensing from a single slide movement. Here, a user slides their finger (or conductive object) across an area of the conductive layer 12 under which the patterned trace 38 on the FPC layer 14 corresponds to a resistor. The resistor trace 38 is connected to an electrode 41 (as was also shown in FIG. 8). The electrode 41 can be or comprise printed conductive traces, wirings or an exposed conductive plate. It can in turn be connected to a capacitive touch sensor controller 44 which may be connected to/be part of a bigger controller 46. As the user slides their finger or an object across the surface 12 above the resistor trace 38, the signal (e.g. capacitance) varies with distance, giving a specific signal value proportional to where the touch is happening. As depicted by the plot on the right hand side of FIG. 12, the signal produced (and detected) by the controller decreases with time/distance. The pattern of the resistor trace 38 can be configured to various widths, lengths and overall profile to satisfy the particular sensing requirement for which it is intended.

Figure 13A:
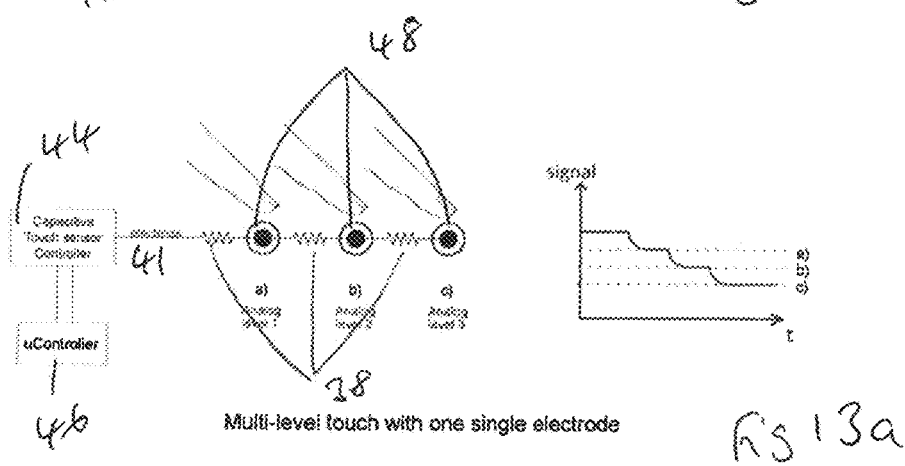

FIG. 13a depicts how multi-level touch sensing can be achieved with a single electrode 41. Here a plurality of contact touch points 48 are provided in series with resistor traces 38. The signal starts high and when a user touches the touch point 48a nearest the electrode 41 the signal drops to a first predefined level a). When the user touches the next touch point 48b, the signal drops further to a second predefined level b). When the user touches the next touch point 48c, further again from the electrode 41, the signal drops to a third predefined level c). This is depicted in the signal versus distance plot on the right hand side of FIG. 13a. This can be used for a series of user-pressable buttons, dual (two-part) buttons etc. Two, or three or more contact touch points 48 can be arranged to accommodate different touch sensing resolutions. Although shown as such in FIG. 13a, the resistor traces 38 do not have to be arranged in a linear fashion.

Figure 13B:
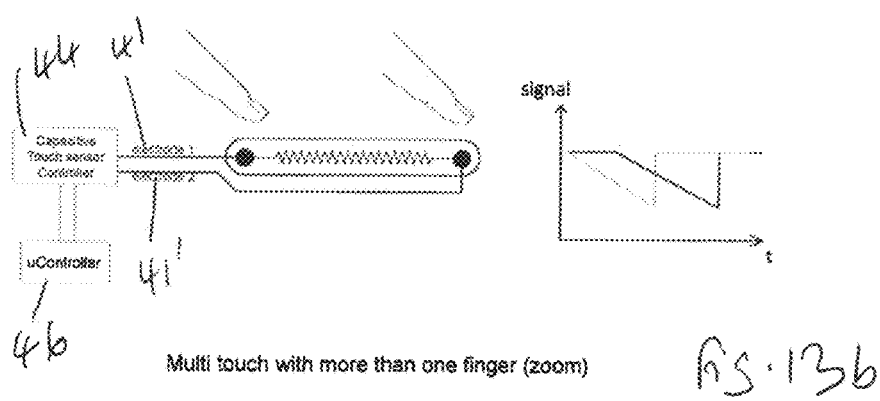

Gesture control with two or more fingers/objects, or "multitouch", is also achievable. By having two electrodes 41, 41' connected to a single resistor trace 38, and where there is a certain resistivity R between the two connections, the two inputs interact (and don't short circuit), providing for multi-touch gestures like slide (using one finger), pinching and zooming (two fingers). This is depicted in FIG. 13b. The plot on the right shows the signals detected for each finger movement, and their behaviour can be used to determine if and how a pinching/zooming motion has occurred.

Interactions with the conductive material 12 therefore involve movement near and/or across the surface and/or applying a force or pressure to the surface 12. Force sensing (Z direction) can be achieved by a conductive or non-conductive object urging the layers 12, 14 into contact; capacitive touch sensing (XY direction) is reliant upon a conductive object being near or in contact with the conductive layer 12. Force movement in the XY direction can also be detected by a conductive object moving across the surface, and or a conductive or non-conductive object applying sufficient pressure so contact exists between the layers 12, 14 in a plurality of locations across the surface 12. Therefore, aspects and embodiments of the invention, advantageously offer both location touch (XY) sensing and pressure/force (Z) sensing simultaneously. The conductive layer 12 is used for all sensing measurements, but in differing ways. The ability to produce both analogue and digital signals has many uses, e.g. using the analogue signals for sensing and control and the digital switching to light an LED to show the system is working properly.

Applying the same concept, in an alternative embodiment, an array of resistive lines 38 using multiple electrodes 41 can be provided, as is discussed further below.

Figure 14:
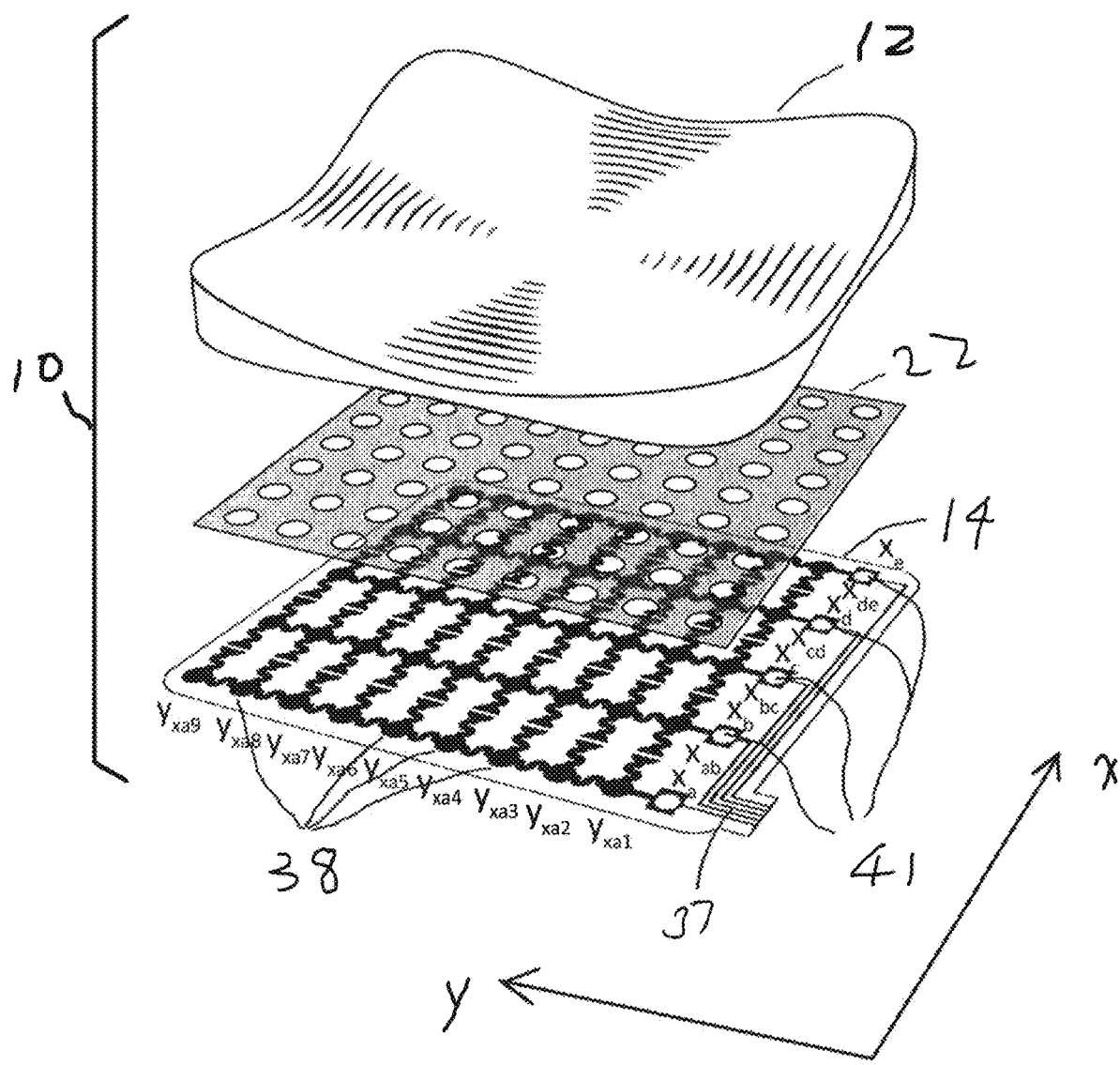
FIG. 14 shows an exemplary XY sensing device.

FIG. 14 illustrates another alternative form of the sensor device 10. It comprises a generally square sheet conductive material layer 12 (although other forms/shapes could be used) with 3D features on top for user touch guidance (although these need not be present). It further comprises electrodes 41, connecting conductive traces 37, and a resistive pattern 38 printed on the FPC layer 14. A separation layer 22 separates the conductive layer 12 and the resistive FPC layer 14. This sensor device 10 may in particular be used for XY touch location and/or zooming control functions.

In use, when a user touches or moves their finger or an object across the surface, the activated electrode or electrodes 41 can be identified within an approximate range. This can be achieved by identifying the touch in the X direction (reading Xa, Xab, Xb, . . . ) by seeing which trace or traces 37 show a detectable signal change. Reading the real-time value of the signal from the activated electrode(s) caused by the difference in the resistivity of the resistor traces applied on the electrodes throughout its full length can position the touch in the Y direction (reading Yxa1, Yxa2, Yxa3, . . . ). (Of course the way the X and Y readings are taken is interchangeable in other embodiments.) One more ore algorithms can be applied to smooth the signals to prevent mis-readings. Due to the analogue nature of the signals, touch XY position resolution can be increased by approximating in-between values. Multi-touch function can also be implemented by separating two readings happening simultaneously.

FIG. 15-19 show examples of alternative FPC layer 14 configurations, within a sensor device system comprising of a separation layer 22, a conductive material layer 12, and a FPC layer 14. At the same time, it should be understood that the FPC layer 14 configurations is not limited to the disclosed examples. Different resistor trace profiles and electrode layouts can be implemented to facilitate different sensing requirements.

FIG. 15 illustrates an example horizontal distribution of resistive lines 38. Each point touchable along the line has a unique "amplitude" value of the capacitive signal. The change of the capacitive signal among the electrodes (slope) can be plotted (X axis) against the electrode (or mix of electrodes) activated in the touch (Y axis). Touch location and force information can be obtained by looking at the percentage of the touched area of two neighbouring electrodes touched at the same time.

FIG. 16 illustrates an example diagonal distribution of resistive lines 38 that can be operated in a similar way as the embodiment of FIG. 15.

Both FIGS. 15 and 16 use wider resistor traces 38, giving various separation layer 12 configuration possibilities. For example, if a higher resolution is required, the apertures on the separation layer can be of smaller area and denser. Similar to FIG. 14, when an area is touched, its position can be determined by identifying which electrode (Xa, Xb, Xc . . . ) has been activated and the activated electrodes' real time reading (Yxa, Yxb, Yxc, . . . ). Multi-touch functionality can also be implemented by separating two readings happening simultaneously.

An alternative arrangement is shown in FIG. 17. This shows a discrete distribution of points using an array of resistive electrodes. This works on the same principles as the diagonal organization of FIG. 15.

This idea comes directly from FIG. 15, taking the same concept of an array of resistive lines diagonally organized. In the embodiment shown there are nine different electrodes 38a-38i. In this embodiment, instead of having a continuous line distributed along certain area, as in FIG. 15, here there are specific points 50 distributed in an organized way. Instead of reading a continuous change of resistance, in this embodiment it is only the resistance reading at the (eventually exposed) points that is important. Preferably, the same resistivity change between two points exists in all of the electrodes 38. This provides a "discrete" slope made of steps provided by the point 51 readings.

In the particular example shown, the total pad area was divided into squares, and four reading points 50 were defined in each square. This essentially provides a resolution of the grid. The resolution can be altered, incrementing the number of points per square, but this will depend on the size of the total pad area. The possibility of obtaining information by touching neighbouring electrodes remains.

A further alternative embodiment is shown in FIG. 18, which depicts another discrete distribution of points using resistive electrodes. This array uses a similar logic of discrete points. The readings from the measurement points 50 can be defined/interpreted as follows, and with reference to FIG. 19.

The distance between two points 50 is always the same. That means the resistance change from one point 50 to another (adjacent) point 50 is always the same. The distance from a starting point (sp) to two adjacent points 1a and 1b is the same. Therefore, the resistance reading between sp-1a and sp-1b is the same. Resistance, then, should be the same between points sp-2a and sp-2b, sp-3a and sp-3b and so on.

The way of differentiating signals from 1a and 1b for example, to identify whether point 1a or 1b has been touched, lies in realising that the reading coming from 1a originates only from electrode 1, and the reading from point 1b is due to touch that activates both electrode 1 and electrode 2.

In the various embodiments of FIGS. 1-2, 4-5 and 11-19, discrete locations are provided on the FPC layer 14 (with a separation layer) where the touch is read, in order to analyse the amplitude of the signal, to facilitate determining where the touch is happening in a plane.

Software is provided for taking data from the measured signals, translating that into a reading that is representative of an action that has been performed on the sensor device 10. The software is configured to control an electrical component based on the amount of pressure/variations in pressure applied by a user (e.g. linear control of volume or speed on a video game) and/or provide digital switching (on/off) dependent on pressure exerted equalling or exceeding a preset threshold. The software can take data from the movement performed (e.g. sliding, pinching, and other multitouch gestures). This can be used e.g. for scrolling, sliding and tracking devices and applications. A display can be provided for displaying the results/calculations from the software detections and/or calculations. The display may be a textual, graphical or visual display, e.g. replicating the device 10 or features/components thereof, or an effect of operating the device—e.g. as discussed in relation to FIG. 21.

Certain software methods can be employed to enhance the sensing robustness and detect patterns in the signals. In one embodiment, machine learning and analytic algorithms are employed in order to detect noisy signals. In another example, a trend detection algorithm is used to discriminate the touch direction using signals acquired by only one electrode or sensor. Embodiments of the present invention can also perform intricate touch speed, pressure and location sensing with limited amount of electrodes.

Figure 20:
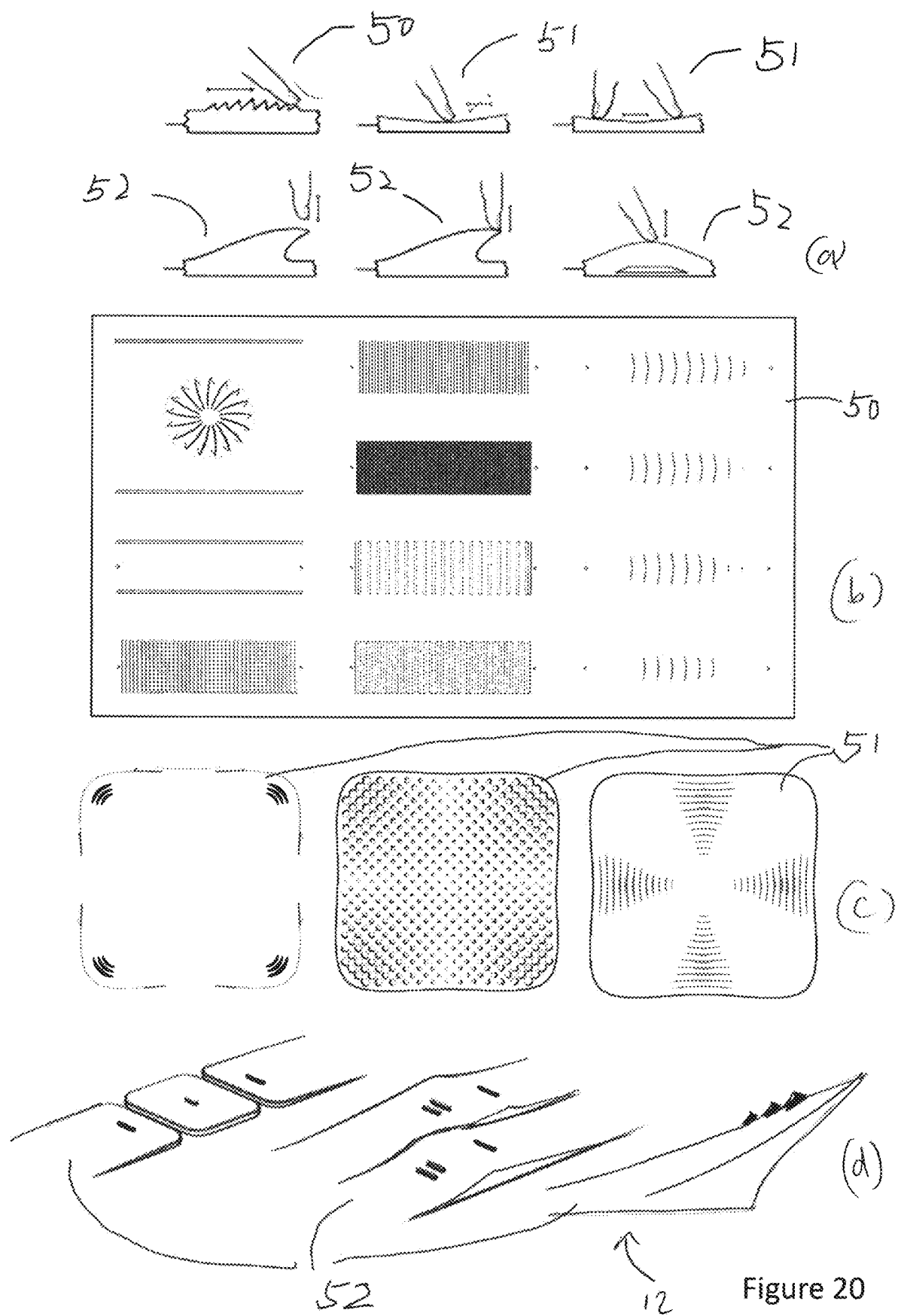
FIG. 20 shows example conductive layer surface profiles.

Any or all of the above features can be selected and integrated in the same device, where the 3D profiles of the conductive interface are not limited to the mentioned specifications. FIG. 20 shows a selection of sensor device 10 forms from the top view showing only the conductive layer 12. (The separation layers 22 and FPC layers 14 can be configured according to previously principles.)

FIG. 20a shows, in cross section, a number of different surface profiles for conductive layer 12. Each conductive layer profile is configured for one or more particular user interactions. More specifically, wave and ripple-like profiles 50 are examples of user interactive area can facilitate a sliding control function. Profiles of a general square interactive area 51 show examples of XY touch location and zooming control functions. 3D profiles 52 can facilitate push/press interactive areas capable of switching and pressure-sensing functions. The arrows in FIG. 20a depict the direction of user/object movement that the profile is intended to facilitate/detect.

FIGS. 20b and 20c show, in plan view, a number of different variations of surface textures that can be provided on/in the conductive layer 12 respectively showing a wave/ripple-like profile 50 for facilitate a sliding control function and a square interactive area 51 for XY touch location and/or zooming control functions.

Figure 6:
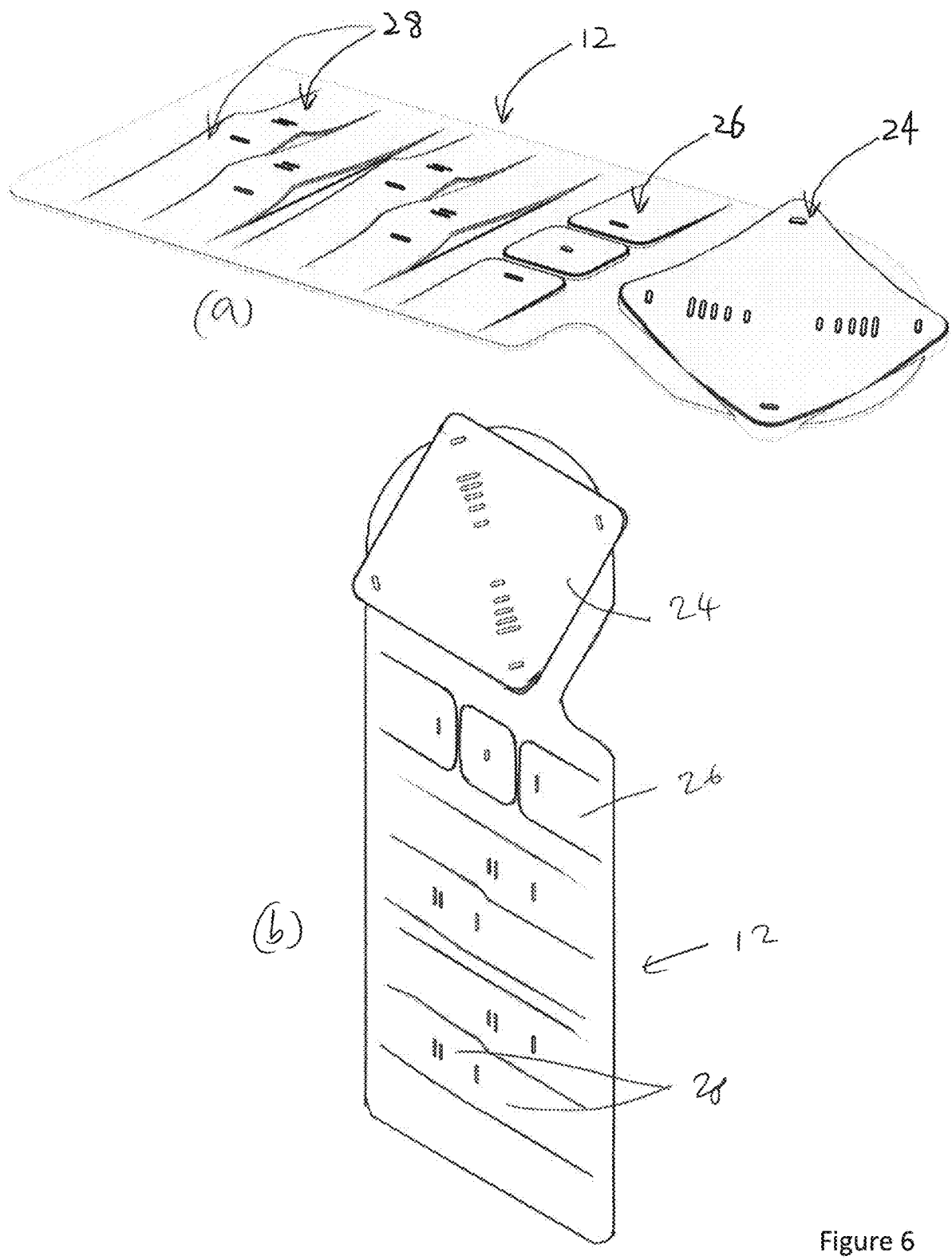
FIG. 6 shows a layer of electrically conductive material.

FIG. 20c shows a perspective view (on the left) and a side/cross-sectional view (on the right) of an embodiment of the conductive layer 12 of FIG. 6, showing a wave/ripple-like profile 50 for facilitate a sliding control function.

FIG. 21a shows a device 10 according to an embodiment of an embodiment of the invention 10 in use in an automotive interior door 23. The device 10 is electrically connected (e.g. wired with connector 54 or wireless) to an electronic control panel or interface 56 (which may be provided via an app). An LED indicator 58 may be provided in the conductive layer 12 that illuminates when a hand or object contacts the control surface 12.

Switch buttons 60, 62, 64 are provided on the conductive surface 12, that switch between a display of a left, middle and right camera. Corresponding camera views 60', 62', 64' are displayable on the interface 56. Pressure controls 66, 68 can be used to control the window shield position, as replicated on the display 56 by images 66', 68'. One or more other controls and/or displays may be provided as needed.

Advantageously, embodiments of the invention provide a seamless surface solution (i.e. no gaps or breaks in the surface). Furthermore, the deformable material layer 12 provides an ergonomic and tactile soft touch and 3D features for a premium user experience. The software/user interface can be configured to provide integrated analogue functions/control including LED intensity and colour morphing, intuitive mirror view navigation and dynamic window control with just a simple touch.

Aspects and embodiments of the present invention have many uses. For example the sensor device 10 can be applied to an independent touch control product and/or can be applied to integrated human machine interface systems in various products. It is particularly useful in automotive interior applications with advantages such as it being waterproof and dirt-proof with a seamless interface material surface 12. Aspects and embodiments of the present invention also enhance touch control resolution and add analogue pressure sensing into applications including gaming handheld consoles or consumer electronics. Aspects and embodiments of the present invention also provide the current industrial automation industry with a high-resolution and high-sensitivity sensor solution when embedded in robotic hands.

From reading the present disclosure, other variations and modifications will be apparent to the skilled person. Such variations and modifications may involve equivalent and other features which are already known in the art of wireless communication, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. Corresponding method steps are envisaged for embodiments relating to the use device and system arrangements, and corresponding device and system embodiments are envisaged where method steps are described.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and any reference signs in the claims shall not be construed as limiting the scope of the claims.

The invention claimed is:

1. A sensor device for generating one or more electrical signals, comprising:
   a unitary layer of molded electrically conductive material;
   a circuitry layer comprising an electronic connector and/or circuitry; and
   a non-conductive separation layer provided between the layer of electrically conductive material and the circuitry layer to prevent an electrical connection between the layer of electrically conductive material and the circuitry layer in non-sensing areas,
   wherein the separation layer comprises one of more apertures at sensing areas configured to selectively permit the layer of electrically conductive material to contact the circuitry layer through the one or more apertures upon pressure or force applied thereto,
   wherein the sensor device is configured to
      (i) produce a change in one or more electrical signals in response to pressure or force being applied to the electrically conductive material urging the layer of electrically conductive material towards the circuitry layer, and
      (ii) produce a change in one or more electrical signals in response to a conductive object being near to or in contact with a surface of the electrically conductive material, and create a change in the one or more electrical signals in response to movement of the conductive object across the surface of the electrically conductive material; and
   wherein the sensor device is configured to provide X and Y touch position sensing and Z-direction pressure or force sensing.

2. The sensor of claim 1, wherein the layer of electrically conductive material is formed to comprise one or more projection(s) on a contact face thereof that faces the circuitry layer at locations corresponding to the one or more apertures, the projection(s) configured to contact the circuitry layer through the one or more apertures upon pressure or force applied thereto.

3. The sensor device of claim 1, wherein the electrical signal is a voltage or a capacitance and movement of a conductive object across the device causes a change in the voltage or a capacitance; and/or wherein the electrical signal is a voltage or a capacitance and pressure on or contact with the surface of the layer of conductive material causes a change in the voltage or a capacitance.

4. The sensor device of claim 1, wherein the electrically conductive material is or comprises a flexible, deformable or pliable material.

5. The sensor device of claim 4, wherein the electrically conductive material is deformable, upon pressure or force applied thereto, to make contact with the circuitry layer through the one or more apertures of the separation layer.

6. The sensor device of claim 1, wherein the sensor device is configured to provide a change in the one or more electrical signals:
in response to contact being made between the electrically conductive material and the circuitry layer; and/or
in response to a change in the distance between the electrically conductive material and the circuitry layer.

7. The sensor device of claim 1, wherein the sensor device is configured to provide a change in the one or more electrical signals in response to the conductive object applying pressure to the electrically conductive material.

8. The sensor device of claim 1, wherein the electrically conductive material is arranged as a touch interface layer.

9. The sensor device of claim 1, wherein the electrically conductive material is formed, or is formed by molding, to comprise one or more user interactive areas.

10. The sensor device of claim 9, wherein the user interactive area is a push or click button formed in or on the electrically conductive material, and comprising one or more of a projection, recess or insert configured to contact the circuitry layer when pressure is applied thereto.

11. The sensor device of claim 1, wherein the circuitry layer is or comprises a printed circuit board or a flexible printed circuit board.

12. The sensor device of claim 1, wherein the circuitry layer comprises one or more areas of printed conductors.

13. The sensor device of claim 12, wherein the circuitry layer comprises one or more areas of printed conductors in locations corresponding to locations of the one or more apertures in the separation layer.

14. The sensor device of claim 1, wherein the circuitry layer comprises one or more of a: resistor element, an array of resistive lines and a contact sensing location.

15. A method of sensing an electrical signal, the method comprising:
using a sensing device comprising:
a unitary layer of molded electrically conductive material;
a circuitry layer comprising an electronic connector and/or circuitry; and
a non-conductive separation layer provided between the layer of electrically conductive material and the circuitry layer to prevent an electrical connection between the layer of electrically conductive material and the circuitry layer in non-sensing areas,
wherein the separation layer comprises one of more apertures at sensing areas configured to selectively permit the layer of electrically conductive material to contact the circuitry layer through the one or more apertures upon pressure or force applied thereto,
wherein the sensor device is configured to
(i) produce a change in one or more electrical signals in response to pressure or force being applied to the electrically conductive material urging the layer of electrically conductive material towards the circuitry layer, and
(ii) produce a change in one or more electrical signals in response to a conductive object being near to or in contact with a surface of the electrically conductive material, and create a change in the one or more electrical signals in response to movement of the conductive object across the surface of the electrically conductive material; and
wherein the sensor device is configured to provide X and Y touch position sensing and Z-direction pressure or force sensing; and
selectively bringing the electrically conductive material and circuitry layer into contact and/or moving a conductive object near to and/or across the electrically conductive material of the sensing device.

16. A computer program configured to, when executed, cause a computing device to perform the following steps:
using a sensing device comprising:
a unitary layer of molded electrically conductive material;
a circuitry layer comprising an electronic connector and/or circuitry; and
a non-conductive separation layer provided between the layer of electrically conductive material and the circuitry layer to prevent an electrical connection between the layer of electrically conductive material and the circuitry layer in non-sensing areas,
wherein the separation layer comprises one of more apertures at sensing areas configured to selectively permit the layer of electrically conductive material to contact the circuitry layer through the one or more apertures upon pressure or force applied thereto,
wherein the sensor device is configured to
(i) produce a change in the one or more electrical signals in response to pressure or force being applied to the electrically conductive material urging the layer of electrically conductive material towards the circuitry layer, and
(ii) produce a change in one or more electrical signals in response to a conductive object being near to or in contact with a surface of the electrically conductive material, and create a change in the one or more electrical signals in response to movement of the conductive object across the surface of the electrically conductive material; and
wherein the sensor device is configured to provide X and Y touch position sensing and Z-direction pressure or force sensing; and
selectively bringing the electrically conductive material and circuitry layer into contact and/or moving a conductive object near to and/or across the electrically conductive material of the sensing device.

17. The computer program of claim 16, further configured to, when executed, cause a computing device to detect touch position, touch pressure, movement speed, movement direction and proximity to a measurement sensing location by processing the electrical signal.

18. The computer program of claim 16, wherein the computer program contains instructions to process signals over a period of time and calculate, from variations or characteristics in the signal, the location of touch on the device, the pressure exerted on the device, the speed of movement of the object across the surface and/or the direction of movement of the object.

* * * * *